United States Patent
Nam et al.

(10) Patent No.: US 12,425,792 B2
(45) Date of Patent: Sep. 23, 2025

(54) VIDEO PROCESSING DEVICE AND METHOD

(71) Applicant: SAMSUNG ELECTRONICS CO., LTD., Suwon-si (KR)

(72) Inventors: Woohyun Nam, Suwon-si (KR); Yoonjae Son, Suwon-si (KR); Hyunkwon Chung, Suwon-si (KR); Sunghee Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 260 days.

(21) Appl. No.: 18/126,794

(22) Filed: Mar. 27, 2023

(65) Prior Publication Data
US 2023/0239643 A1  Jul. 27, 2023

Related U.S. Application Data

(63) Continuation of application No. PCT/KR2021/013231, filed on Sep. 28, 2021.

(30) Foreign Application Priority Data

Sep. 28, 2020 (KR) .................. 10-2020-0126361
Jan. 19, 2021 (KR) .................. 10-2021-0007681

(51) Int. Cl.
*H04S 7/00* (2006.01)
*G06T 7/246* (2017.01)
(Continued)

(52) U.S. Cl.
CPC ............. *H04S 7/302* (2013.01); *G06T 7/246* (2017.01); *G11B 27/10* (2013.01); *H04S 3/008* (2013.01);
(Continued)

(58) Field of Classification Search
CPC .......... H04S 7/302; H04S 7/307; H04S 3/008; H04S 2420/11; G06T 7/246;
(Continued)

(56) References Cited

U.S. PATENT DOCUMENTS 7,590,249 B2   9/2009  Jang et al.
9,473,870 B2  10/2016  Sen
(Continued)

FOREIGN PATENT DOCUMENTS

JP   2011-71685 A     4/2011
JP   2020-144574 A    9/2020
(Continued)

OTHER PUBLICATIONS

Yu Jin Lee et al., "A Personal Video Event Classification Method based on Multi-Modalities by DNN-Learning", The Korean Institute of Information Scientists and Engineers, pp. 1281-1297, 2016.
(Continued)

*Primary Examiner* — Yassin Alata
(74) *Attorney, Agent, or Firm* — Sughrue Mion, PLLC

(57) ABSTRACT

A video processing apparatus includes a memory storing instructions, and at least one processor configured to execute the instructions to generate a plurality of feature information by analyzing a video signal comprising a plurality of images based on a first DNN, extract a first altitude component and a first planar component corresponding to a movement of an object in a video from the video signal based on a second DNN, extract a second planar component corresponding to a movement of a sound source in audio from a first audio signal based on a third DNN, generate a second altitude component based on the first altitude component, the first planar component, and the second planar component, output a second audio signal comprising the second altitude component based on the feature information, and synchronize
(Continued)

the second audio signal with the video signal and output the synchronized second audio signal and video signal.

20 Claims, 20 Drawing Sheets

(51) Int. Cl.
*G11B 27/10* (2006.01)
*H04S 3/00* (2006.01)

(52) U.S. Cl.
CPC .... *H04S 7/307* (2013.01); *G06T 2207/10016* (2013.01); *G06T 2207/20081* (2013.01); *G06T 2207/20084* (2013.01); *H04S 2400/01* (2013.01); *H04S 2400/11* (2013.01); *H04S 2400/15* (2013.01); *H04S 2420/11* (2013.01)

(58) Field of Classification Search
CPC . G06T 2207/10016; G06T 2207/20081; G06T 2207/20084; G11B 27/10; G04S 2400/01; G04S 2400/11; G04S 2400/15
See application file for complete search history.

(56) References Cited

U.S. PATENT DOCUMENTS

| | | | |
|---|---|---|---|
| 9,723,287 | B2 | 8/2017 | Jeong et al. |
| 9,888,333 | B2 | 2/2018 | Zurek et al. |
| 10,419,867 | B2 | 9/2019 | Seo et al. |
| 2016/0140980 | A1* | 5/2016 | Disch ............... G10L 19/0212 |
| 2018/0054689 | A1 | 2/2018 | Chen et al. |
| 2019/0306451 | A1* | 10/2019 | Wang ............... H04N 21/8106 |
| 2020/0288255 | A1 | 9/2020 | Jung et al. |
| 2020/0288256 | A1 | 9/2020 | Jung et al. |

FOREIGN PATENT DOCUMENTS

| | | |
|---|---|---|
| JP | 7116424 A | 8/2022 |
| KR | 10-0542129 B1 | 1/2006 |
| KR | 10-2015-0032253 A | 3/2015 |
| KR | 10-1516644 B1 | 5/2015 |
| KR | 10-2020-0107757 A | 9/2020 |
| WO | 2017/126895 A1 | 7/2017 |

OTHER PUBLICATIONS

"Development of sound source object separation/location estimation and 3D rendering software technology for converting 2D stereo content into 3D stereo sound content", Apr. 14, 2016, (102 pages).
Chai-Jong Song et al., "Sound source object position estimation technology for converting 2D stereo content into 3D stereo sound content", The Korean Institute of Electrical Engineers, 2014, (4 pages).
Communication dated Feb. 28, 2022, issued by the Korean Intellectual Property Office in Korean Patent Application No. 10-2021-0007681.
Ruohan Gao et al., "2.5D Visual Sound", pp. 324-333, 2019.
International Search Report (PCT/ISA/210) issued by the International Searching Authority on Jan. 5, 2022 in International Application No. PCT/KR2021/013231.
Written Opinion (PCT/ISA/237) issued by the International Searching Authority on Jan. 5, 2022 in International Application No. PCT/KR2021/013231.
Communication dated Feb. 8, 2024 issued by the European Patent Office in European Application No. 21873009.1.
Senocak et al., "Learning to Localize Sound Source in Visual Scenes", 2018 IEEE/CVF Conference On Computer Vision and Pattern Recognition, IEEE, Jun. 18, 2018, pp. 4358-4366 (9 pages total).

* cited by examiner

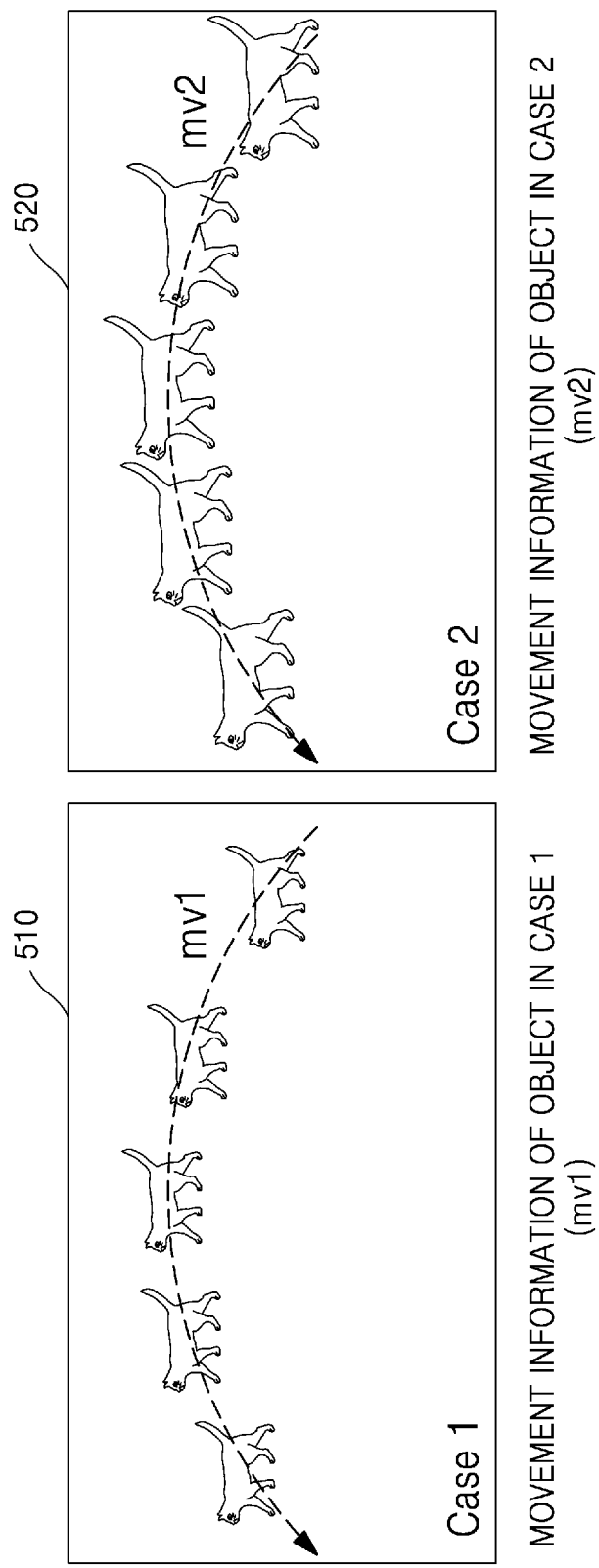

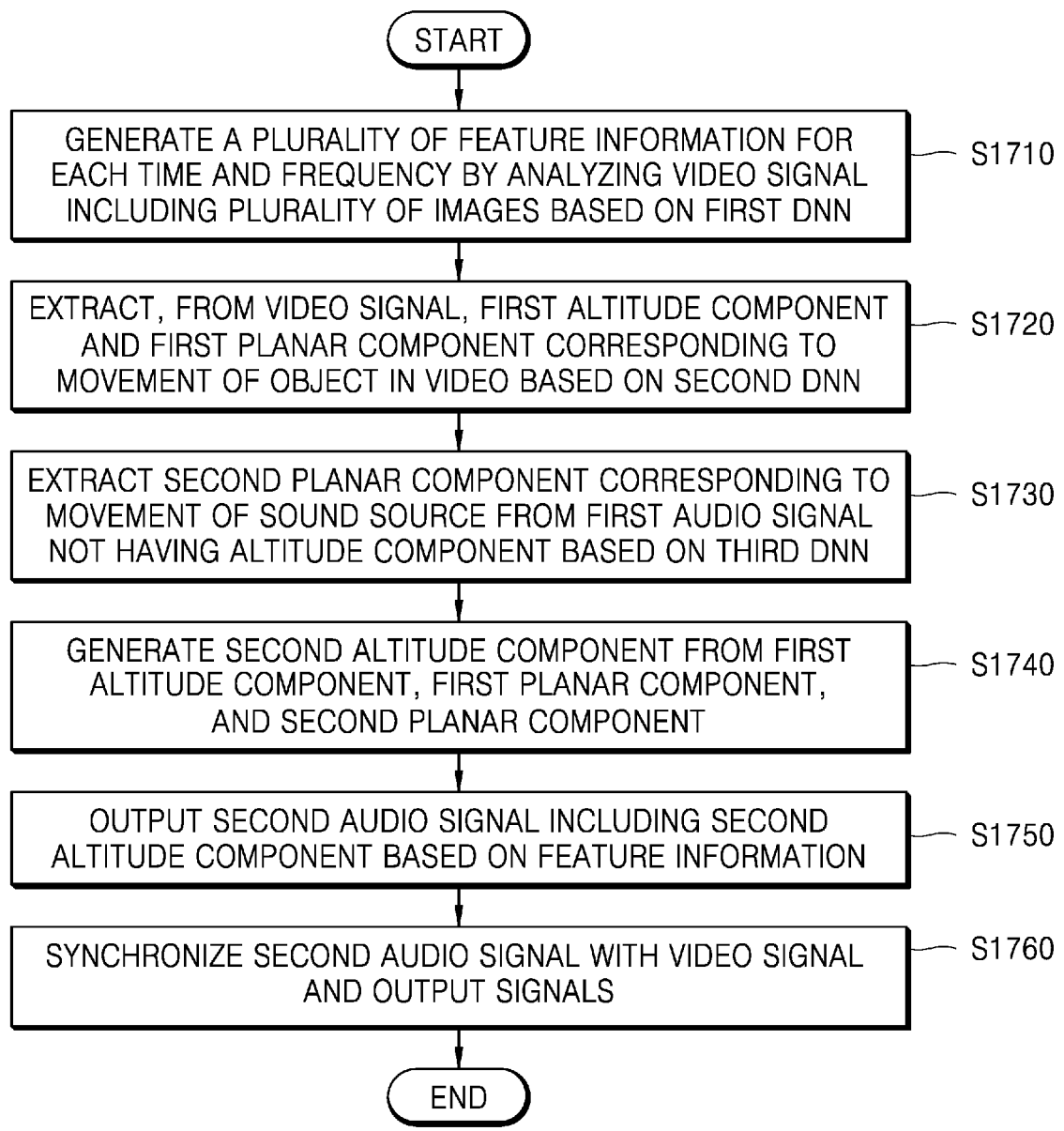

VIDEO PROCESSING DEVICE AND METHOD

CROSS-REFERENCE TO RELATED APPLICATION

This application is a by-pass continuation application of International Application No. PCT/KR2021/013231, filed on Sep. 28, 2021, which is based on and claims priority to Korean Patent Application No. 10-2020-0126361, filed on Sep. 28, 2020 and Korean Patent Application No. 10-2021-0007681, filed on Jan. 19, 2021 in the Korean Intellectual Property Office, the disclosures of which are incorporated by reference herein in their entireties.

BACKGROUND

1. Field

The disclosure relates to a field of processing a video, and more particularly, to a field of generating a three-dimensional audio signal, and more particularly, to a field of generating, from a two-dimensional audio signal, a three-dimensional audio signal including a plurality of channels, based on artificial intelligence (AI).

2. Description of Related Art

Audio signals are generally two-dimensional audio signals, such as 2-channel, 5.1-channel, 7.1-channel, and 9.1 channel audio signals.

However, because the two-dimensional audio signals have uncertain or no audio information in a height direction (audio information of an altitude component), it is necessary to generate a three-dimensional information (n-channel audio signal or multi-channel audio signal, where n is an integer greater than 2) to provide a spatial stereoscopic effect of sound.

Because normal audio signal acquisition devices (for example, a microphone) are capable of acquiring only two-dimensional audio signals, individual sound sources may be secured from the two-dimensional audio signals, and three-dimensional audio signals are generated through mixing and monitoring in consideration of a movement of sound sources, but this is a very difficult and time-consuming task.

Accordingly, a method of generating a three-dimensional audio signal by using a video signal corresponding to a two-dimensional audio signal together with the two-dimensional audio signal is needed.

SUMMARY

Provided are video processing device and method to generate a three-dimensional audio signal more easily by using a two-dimensional audio signal and video information corresponding to the two-dimensional audio signal.

According to an aspect of the disclosure, a video processing apparatus includes a memory storing one or more instructions, and at least one processor configured to execute the one or more instructions to: generate a plurality of feature information for time and frequency by analyzing a video signal comprising a plurality of images based on a first deep neural network (DNN); extract a first altitude component and a first planar component corresponding to a movement of an object in a video from the video signal based on a second DNN; extract a second planar component corresponding to a movement of a sound source in audio from a first audio signal based on a third DNN; generate a second altitude component based on the first altitude component, the first planar component, and the second planar component; output a second audio signal comprising the second altitude component based on the plurality of feature information; and synchronize the second audio signal with the video signal and output the synchronized second audio signal and video signal.

The at least one processor may be further configured to execute the one or more instructions to: synchronize the video signal with the first audio signal; generate M pieces of one-dimensional image feature map information corresponding to the movement of the object in the video from the video signal by using the first DNN, M being an integer greater than or equal to 1; and generate the plurality of feature information for time and frequency by performing tiling related to frequency on the M pieces of one-dimensional image feature map information, the plurality of feature information including the M pieces of image feature map information for time and frequency.

The at least one processor may be further configured to execute the one or more instructions to: synchronize the video signal with the first audio signal: extract N+M pieces of feature map information corresponding to the movement of the object in a horizontal direction in the video with respect to time from the video signal by using a (2-1st) DNN, each of N and M being integers greater than or equal to 1; extract N+M pieces of feature map information corresponding to the movement of the object in a vertical direction in the video with respect to time from the video signal by using a (2-2nd) DNN, wherein the (2-1st) DNN and the (2-2nd) DNN are included in the second DNN and are different from each other; extract N+M pieces of feature map information corresponding to the movement of the sound source in the horizontal direction in the audio from the first audio signal by using a third DNN; and generate N+M pieces of correction map information with respect to time corresponding to the second altitude component based on the N+M pieces of feature map information corresponding to the movement of the object in the horizontal direction in the video, the N+M pieces of feature map information corresponding to the movement of the object in the vertical direction in the video, and the N+M pieces of feature map information corresponding to the movement of the sound source in the horizontal direction in the audio; and generate N+M pieces of correction map information with respect to time and frequency corresponding to the second altitude component by performing tiling related to frequency on the N+M pieces of correction map information with respect to time.

The at least one processor may be further configured to execute the one or more instructions to: generate time and frequency information for a 2-channel by performing frequency conversion operation on the first audio signal; generate N pieces of audio feature map information with respect to time and frequency from the time and frequency information for the 2-channel by using a (4-1st) DNN, N being an integer greater than or equal to 1; generate N+M pieces of audio and image integrated feature map information based on M pieces of image feature map information with respect to time and frequency included in the plurality of feature information for time and frequency and the N pieces of audio feature map information with respect to time and frequency; generate a frequency domain second audio signal for n-channel (where, n is an integer greater than 2) from the N+M pieces of audio and image integrated feature map information by using a (4-2nd) DNN; generate an audio correction map information for the n-channel from N+M pieces of correction map information with respect to time and frequency corresponding to the N+M pieces of audio/image integrated feature map information and the second altitude component by using a (4-3rd) DNN; generate a corrected frequency domain second audio signal for the n-channel by performing correction on the frequency domain second audio signal for the n-channel based on the audio correction map information for the n-channel; and output the second audio signal for the n-channel by inversely frequency converting the corrected frequency domain second audio signal for the n-channel, wherein the (4-1st) DNN, the (4-2nd) DNN and the (4-3rd) DNN are included in a fourth DNN for outputting the second audio signal and are different from each other.

The at least one processor may be further configured to execute the one or more instructions to output the second audio signal based on a fourth DNN for outputting the second audio signal, wherein the first DNN is a DNN for generating the plurality of feature information for time and frequency, the second DNN is a DNN for extracting the first altitude component and the first planar component, the third DNN is a DNN for extracting the second planar component, and wherein the at least one processor is further configured to execute the one or more instructions to train the first DNN, the second DNN, the third DNN and the fourth DNN according to a result of comparison of a first frequency domain training reconstruction three-dimensional audio signal reconstructed based on and a first training two-dimensional audio signal and a first training image signal with a first frequency domain training three-dimensional audio signal obtained by frequency converting a first training three-dimensional audio signal.

The at least one processor may be further configured to execute the one or more instructions to: calculate generation loss information by comparing the first frequency domain training reconstruction three-dimensional audio signal with the first frequency domain training three-dimensional audio signal, and update parameters of the first to fourth DNNs based on the calculated generation loss information.

The at least one processor may be further configured to execute the one or more instructions to output the second audio signal based on a fourth DNN for outputting the second audio signal, wherein the first DNN is a DNN for generating the plurality of feature information for time and frequency, the second DNN is a DNN for extracting the first altitude component and the first planar component, and the third DNN is a DNN for extracting the second planar component, and wherein the at least one processor is further configured to execute the one or more instructions to train the first DNN, the second DNN, the third DNN, and the fourth DNN according to a result of comparison of a frequency domain training reconstruction three-dimensional audio signal reconstructed based on a first training two-dimensional audio signal, a first training image signal and a user input parameter information with a first frequency domain training three-dimensional audio signal obtained by frequency converting a first training three-dimensional audio signal.

The at least one processor may be further configured to execute the one or more instructions to: calculate generation loss information by comparing the frequency domain training reconstruction three-dimensional audio signal with the first frequency domain training three-dimensional audio signal, and update parameters of the first to fourth DNNs based on the calculated generation loss information.

The first training two-dimensional audio signal and the first training image signal may be obtained from a portable terminal, and the first training three-dimensional audio signal may be obtained from an ambisonic microphone of the portable terminal.

Parameter information of the first to fourth DNNs obtained as a result of training of the first DNN, the second DNN, the third DNN, and the fourth DNN may be stored in the video processing apparatus or may be received from a terminal connected to the video processing apparatus.

According to an aspect of the disclosure, a video processing method of a video processing apparatus includes generating a plurality of feature information for time and frequency by analyzing a video signal comprising a plurality of images based on a first deep neural network (DNN); extracting a first altitude component and a first planar component corresponding to a movement of an object in a video, from the video signal based on a second DNN; extracting a second planar component corresponding a movement of a sound source in an audio from a first audio signal based on a third DNN; generating a second altitude component based on the first altitude component, the first planar component, and the second planar component; outputting a second audio signal comprising the second altitude component based on the plurality of feature information; and synchronizing the second audio signal with the video signal and outputting the synchronized second audio signal and video signal.

The generating of the plurality of feature information for time and frequency may include synchronizing the video signal with the first audio signal; generating M pieces of one-dimensional image feature map information corresponding to the movement of the object in the video from the video signal by using the first DNN, M being an integer greater than or equal to 1; and generating the plurality of feature information for time and frequency by performing tiling related to frequency on the M pieces of one-dimensional image feature map information, the plurality of feature information including M pieces of image feature map information for time and frequency.

The extracting of the first altitude component and the first planar component based on the second DNN and the extracting of the second planar component based on the third DNN may include synchronizing the video signal with the first audio signal; extracting N+M pieces of feature map information corresponding to the movement of the object in a horizontal direction in the video with respect to time from the video signal by using a (2-1st) DNN, each of N and M being integers greater than or equal to 1; extracting N+M pieces of feature map information corresponding to the movement of the object in a vertical direction in the video with respect to time from the video signal by using a (2-2nd) DNN, wherein the (2-1st) DNN and the (2-2nd) DNN are included in the second DNN and are different from each other; extracting N+M pieces of feature map information corresponding to the movement of the sound source in the horizontal direction in the audio from the first audio signal by using the third DNN, and wherein the generating of the second altitude component based on the first altitude component, the first planar component, and the second planar component comprises: generating N+M pieces of correction map information with respect to time corresponding to the second altitude component based on the N+M pieces of feature map information corresponding to the movement of the object in the horizontal direction in the video, the N+M pieces of feature map information corresponding to the movement of the object in the vertical direction, and the N+M pieces of feature map information corresponding to the movement of the sound source in the horizontal direction in the audio; and generating N+M pieces of correction map information with respect to time and frequency corresponding to the second altitude component by performing tiling related to a frequency on the N+M pieces of correction map information with respect to time.

The outputting of the second audio signal comprising the second altitude component based on the plurality of feature information may include obtaining time and frequency information for a 2-channel by performing frequency conversion operation on the first audio signal; generating, from the time and frequency information for the 2-channel, N pieces of audio feature map information with respect to time and frequency by using a (4-1st) DNN, N being an integer greater than or equal to 1; generating N+M pieces of audio and image integrated feature map information based on M pieces of image feature map information with respect to time and frequency included in the plurality of feature information for time and frequency and the N pieces of audio feature map information with respect to time and frequency; generating a frequency domain second audio signal for n-channel (wherein, n is an integer greater than 2) from the N+M pieces of audio and image integrated feature map information by using a (4-2nd) DNN; generating a audio correction map information with respect to the n-channel corresponding to the second altitude component from the N+M pieces of audio/image integrated feature map information by using a (4-3rd) DNN; generating a corrected frequency domain second audio signal for the n-channel by performing correction on the frequency domain second audio signal for the n-channel based on the audio correction map information for the n-channel; and outputting the second audio signal for the n-channel by inversely frequency converting the corrected frequency domain second audio signal, wherein the (4-1st) DNN, the (4-2nd) DNN and the (4-3rd) DNN are included in a fourth DNN for outputting the second audio signal and are different from each other.

The outputting of the second audio signal may include outputting the second audio signal based on a fourth DNN for outputting the second audio signal, and wherein the first DNN is a DNN for generating the plurality of feature information for each time and frequency, the second DNN is a DNN for extracting the first altitude component and the first planar component, and the third DNN is a DNN for extracting the second planar component, wherein the method may further include training the first DNN, the second DNN, the third DNN, and the fourth DNN according to a result of comparison of a first frequency domain training reconstruction three-dimensional audio signal reconstructed based on a first training two-dimensional audio signal and a first training image signal with a first frequency domain training three-dimensional audio signal obtained by frequency converting a first training three-dimensional audio signal.

The method may further include calculating generation loss information by comparing the frequency domain training reconstruction three-dimensional audio signal with the first frequency domain training three-dimensional audio signal, and updating parameters of the first to fourth DNNs based on the calculated generation loss information.

Parameter information of the first to fourth DNNs obtained as a result of training of the first DNN, the second DNN, the third DNN, and the fourth DNN may be stored in the video processing apparatus or may be received from a terminal connected to the video processing apparatus.

The outputting of the second audio signal may include outputting the second audio signal based on a fourth DNN for outputting the second audio signal, wherein the first DNN is a DNN for generating the plurality of feature information for each time and frequency, the second DNN is a DNN for extracting the first altitude component and the first planar component, and the third DNN is a DNN for extracting the second planar component, and wherein the method may further include training the first DNN, the second DNN, the third DNN, and the fourth DNN according to a result of comparison of a first frequency domain training reconstruction three-dimensional audio signal reconstructed based on a first training two-dimensional audio signal, a first training image signal and user input information with a first frequency domain training three-dimensional audio signal obtained by frequency converting a first training three-dimensional audio signal.

The method may further including calculating generation loss information by comparing the frequency domain training reconstruction three-dimensional audio signal with the first frequency domain training three-dimensional audio signal, and updating parameters of the first to fourth DNNs based on the calculated generation loss information.

According to an aspect of the disclosure, there is provided a non-transitory computer-readable recording medium having recorded thereon a program for executing the video processing method.

BRIEF DESCRIPTION OF THE DRAWINGS

The above and other aspect, features, and advantages of certain embodiments of the present disclosure will be more apparent from the following description taken in conjunction with the accompanying drawings, in which:

FIGS. 5A to 5B are diagrams for describing a theoretical background from which a mathematical formula used to obtain a domain matching parameter is derived;

FIG. 17 is a flowchart describing a video processing method according to an embodiment.

DETAILED DESCRIPTION

Figure 1:
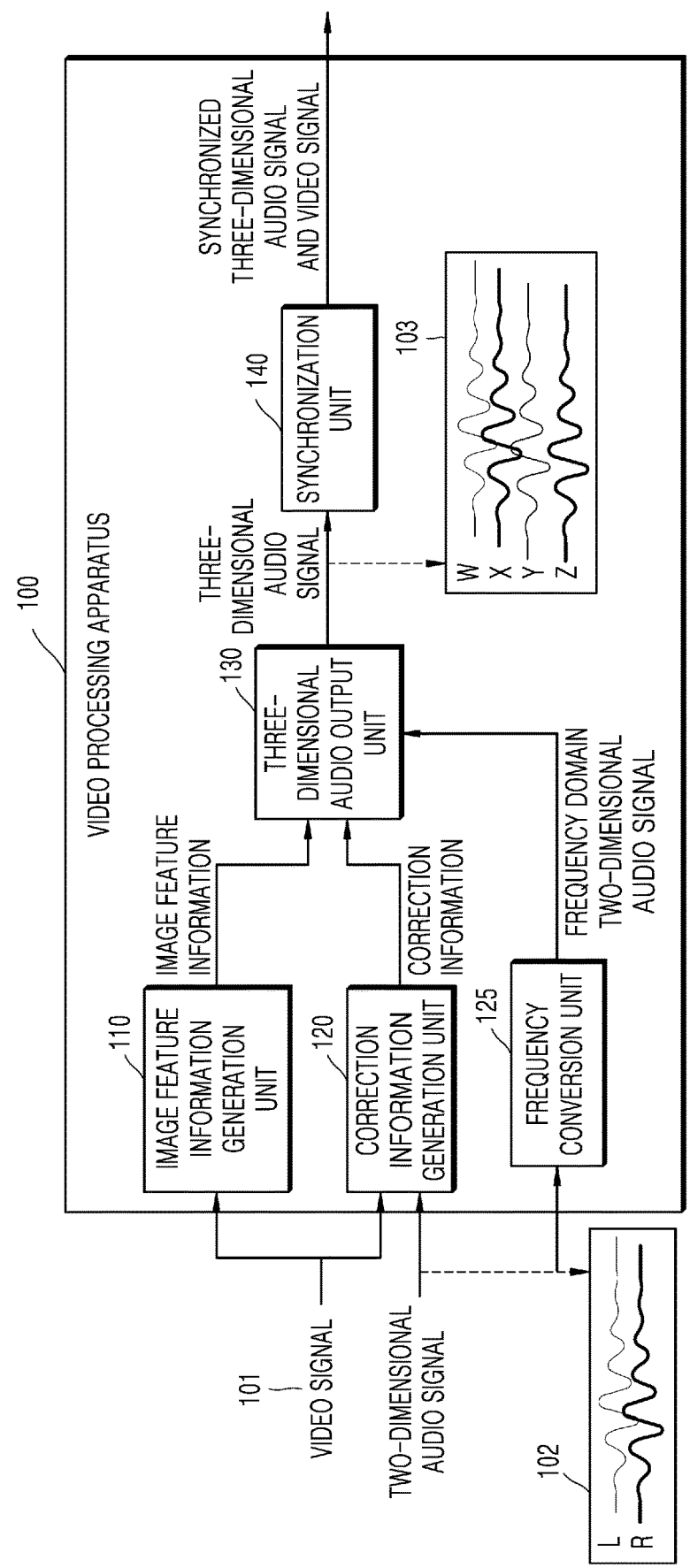
FIG. 1 is a block diagram illustrating a configuration of a video processing apparatus according to an embodiment.

According to one or more embodiments, a three-dimensional audio signal may be generated by using a two-dimensional audio signal and a video signal corresponding thereto.

However, effects that may be achieved by an apparatus and method for processing a video, according to one or more embodiments are not limited to those mentioned above, and other effects that are not mentioned could be clearly understood by a person of skill in the art from the following descriptions.

As the disclosure allows for various changes and numerous embodiments, certain embodiments will be illustrated in the drawings and described in detail in the written description. However, this is not to limit the disclosure to a specific form of implementation, and is to be understood to include all changes, equivalents, and substitutes included in the concept and technical scope of the disclosure.

In describing embodiments, when it is determined that detailed descriptions of the related known art obscures the gist, detailed descriptions thereof are omitted. In addition, numbers (for example, first, second, etc.) used in a process of describing an embodiment are merely identification symbols for distinguishing one element from another element.

In addition, in the disclosure, when it is mentioned that one element is "coupled" or "connected" to another element, the one element may be directly coupled or connected to the other element, but it is to be understood that the elements may be coupled or connected to each other with another intervening element therebetween, unless otherwise specified.

In addition, in the disclosure, when an element is expressed as "-er/or (unit)", "module", or the like, it may denote that two elements are combined into one element, or that one element may be divided into two or more elements for each subdivided function. In addition, each of elements to be described below may additionally perform some or all of functions of other elements in addition to a main function thereof, and some functions from among main functions of each of the elements may be exclusively performed by other elements.

In addition, in the disclosure, a "deep neural network (DNN)" is a representative example of an artificial neural network model that simulates a cranial network, and is not limited to an artificial neural network model using a specific algorithm.

In addition, in the disclosure, a "parameter" is a value used in a calculation process of each layer included in a neural network and may include, for example, a weight (and bias) used when an input value is applied to a certain arithmetic expression. A parameter may be expressed in a matrix form. The parameter is a value set as a result of training and may be updated through additional training data as necessary.

In addition, in the disclosure, a "first DNN" denotes a DNN used to analyze a video signal including a plurality of images and generate a plurality of feature information for time and frequency, a "second DNN" denotes a DNN used to extract a first altitude component and a first plane component corresponding to a movement of an object in a video from a video signal, and a "third DNN" may denote a DNN used to extract a second plane component corresponding to a movement of a sound source within a video from a first audio signal not having an altitude component. The "second DNN" and the "third DNN" may denote DNNs used to generate, from a video signal and a two-dimensional audio signal corresponding to the video signal, correction information between audio features in the two-dimensional audio signal and image features in the video signal. In this case, the correction information between the audio features in the audio signal and the image features in the video signal is information corresponding to a second altitude component to be included in a three-dimensional audio signal to be described below, and may be information used to match altitude components that do are inconsistent between domains of video/audio signals. The "fourth DNN" may denote a DNN used to output a second audio signal including a second altitude component from a first audio signal not having an altitude component based on the plurality of feature information for time and frequency. In this case, the second altitude component may be generated from the first altitude component, the first plane component and the second plane component. The "second DNN" may include a "(2-$1^{st}$) DNN" used to generate feature information corresponding to a movement in a horizontal direction of the video signal, and a "(2-$2^{nd}$) DNN" used to generate feature information corresponding to a movement in a vertical direction of the video signal.

The "third DNN" may be used to generate feature information corresponding to a movement in the horizontal direction of the two-dimensional audio signal.

The "fourth DNN" may include a "(4-$1^{st}$) DNN" used to generate audio feature information from the two-dimensional audio signal, a "(4-$2^{nd}$) DNN" used to generate a three-dimensional audio signal from an audio/video integrated feature information in which the audio feature information and image feature information are integrated, and a "(4-$3^{rd}$) DNN" used to generate correction information fora frequency based on the audio/video integrated feature information and the correction information described above.

Embodiments according to the technical idea of the disclosure are sequentially described in detail below.

FIG. 1 is a block diagram illustrating a configuration of a video processing apparatus according to an embodiment.

As described above, in order to provide a spatial stereoscopic effect of sound, a method for easily generating a three-dimensional audio signal having a large number of audio signal channels is necessary.

As shown in FIG. 1, a video processing apparatus 100 according to an embodiment may include an image feature information generation unit 110, a correction information generation unit 120, a three-dimensional audio output unit 130, and a synchronization unit 140. The disclosure is not limited thereto, and as shown in FIG. 1, the video processing apparatus 100 according to an embodiment may further include a frequency conversion unit 125. Alternatively, the frequency conversion unit 125 may be included in the three-dimensional audio output unit 130.

As shown in FIG. 1, the video processing apparatus 100 may generate a three-dimensional audio signal 103 by using a two-dimensional audio signal 102 and a video signal 101 corresponding to the two-dimensional audio signal 102 as inputs. Here, the two-dimensional audio signal 102 denotes an audio signal in which audio information in the height direction (audio information of an altitude component) is uncertain or not included, and audio information of left-right directions and front-back directions (audio information of a planar component) is certain, such as audio signals of 2-channel, 5.1-channel, 7.1-channel, and 9.1-channel. For example, the two-dimensional audio signal 102 may be a stereo audio including a left (L) channel and a right (R) channel.

In this case, the two-dimensional audio signal 102 may be output through audio signal output devices located in the same height, so that a user may feel a spatial stereoscopic effect of sound in the left-right and front-back directions.

The three-dimensional audio signal 103 denotes an audio signal including audio information in the height direction as well as audio information in the left-right directions and front-back directions. For example, the three-dimensional audio signal 103 may be a 4-channel ambisonic audio signal including a W channel, an X channel, a Y channel, and a Z channel, but is not limited thereto. Here, the W channel signal may indicate the sum of strengths of omnidirectional sound sources, the X channel signal may indicate the difference in strength of front and back sound sources, the Y channel signal indicates may indicate the difference in strength of left and right sound sources, and the Z channel signal may indicate a difference in strength of upper and lower sound sources.

In other words, when a channel is configured to effectively include an audio signal in the height direction (an audio signal of an altitude component), in general, the three-dimensional audio signal may include a multi-channel ambisonic audio signal having a larger number of channels than an audio signal of 2-channel. In this case, the three-dimensional audio signal may be output through audio signal output devices located at different heights, so that the user may feel a spatial stereoscopic effect of sound in the vertical directions (height direction) as well as in the left-right and front-back directions.

In an embodiment of the disclosure, the three-dimensional audio signal 103 may be generated from the two-dimensional audio signal 102 by obtaining image feature information (feature information for time and frequency) from the video signal 101 corresponding to the two-dimensional audio signal, and generating a feature (corresponding to the second altitude component) corresponding to the vertical (height direction) movement of a sound source (corresponding to an object in the video) clearly not included in the two-dimensional audio signal based on a feature (corresponding to the first altitude component and the first planar component) corresponding to a movement of an object (corresponding to a sound source in the audio) in the video included in the image feature information.

A slight difference may be present between an audio domain and a video domain. In other words, in the movement information of the object in the video, movement information in the left-right (X-axis) and vertical directions (Z-axis) is relatively clear, but movement information in the front-back directions (Y-axis) is uncertain. This is because, due to the nature of the video, it is difficult to include information related to front-back directions in the movement information of an object in the video.

Accordingly, when the three-dimensional audio signal is generated from the two-dimensional audio signal by using the movement information of the object in the video, an error may occur. When the two-dimensional audio signal is a 2-channel stereo signal, movement information in the left-right (X-axis) and front-back (Y-axis) directions of the movement information of the sound source (corresponding to the object) in the two-dimensional audio signal is relatively clear, but movement information in the vertical direction (Z-axis) is uncertain.

Accordingly, when correction is made by considering a difference (difference/discrepancy between an audio domain and an image domain) between the movement information in the left-right (X-axis) directions (horizontal direction) of the movement information of the object in the video and the movement information in the left-right (X-axis) directions (horizontal direction) of the movement information of the sound source in the two-dimensional audio signal, the three-dimensional audio signal may be effectively generated and output from the two-dimensional audio signal by using the video signal. The image feature information generation unit 110, the correction information generation unit 120, and the three-dimensional audio output unit 130 in the video processing apparatus 100 may be implemented based on artificial intelligence (AI), and AI for the image feature information generation unit 110, the correction information generation unit 120, and the three-dimensional audio output unit 130 may be implemented as a DNN.

In FIG. 1, the image feature information generation unit 110, the correction information generation unit 120, the three-dimensional audio output unit 130, and the synchronization unit 140 are shown as individual elements. However, the image feature information generation unit 110, the correction information generation unit 120, the three-dimensional audio output unit 130, and the synchronization unit 140 may be implemented through a single processor. In this case, they may be implemented through a dedicated processor, or may be implemented through a combination of a general-purpose processor, such as an application processor (AP), a central processing unit (CPU), and a graphics processing unit (GPU), and software. In addition, a dedicated processor may include a memory for implementing an embodiment of the disclosure, or may include a memory processing unit for using an external memory.

The image feature information generation unit 110, the correction information generation unit 120, the three-dimensional audio output unit 130, and the synchronization unit 140 may also be configured through a plurality of processors. In this case, they may be implemented through a combination of dedicated processors, or may be implemented through a combination of a plurality of general-purpose processors, such as an AP, CPU, or GPU, and software.

The image feature information generation unit 110 may obtain image feature information from the video signal 101 corresponding to the two-dimensional audio signal 102. The image feature information is information about a component for time and frequency) related to the corresponding feature in which movement is present, such as an object in an image, and may be feature information for time and frequency. The corresponding object may correspond to a sound source of the two-dimensional audio signal 102, and accordingly, the image feature information may be visual feature pattern map information corresponding to a sound source for generating a three-dimensional audio.

The image feature information generation unit 110 may be implemented based on AI. The image feature information generation unit 110 may analyze a video signal including a plurality of images and generate a plurality of pieces of feature information for time and frequency based on a first DNN. An example of the first DNN is described below with reference to FIG. 3.

The image feature information generation unit 110 may synchronize the video signal with the two-dimensional audio signal and obtain M pieces of one-dimensional image feature map information (M is an integer greater than or equal to 1) according to a (location or) movement of the object in the video from the video signal 101 by using the first DNN. In other words, M samples may indicate a feature pattern corresponding to a (location or) movement of the object in the video. In other words, the one-dimensional image feature map information may be generated from at least one frame (or frame bin). By repeatedly obtaining the one-dimensional image feature map information, two-dimensional image feature information (feature information for each time) having a plurality of frame bins may be obtained.

The image feature information generation unit 110 may perform tiling on a frequency and fill all frequency bins with the same value, so that three-dimensional image feature map information (feature information for each time and frequency) having an image feature, a frame bin, and a frequency bin component may be obtained. In other words, M pieces of image feature map information for time and frequency may be obtained. Here, a frequency bin denotes a type of frequency index indicating a frequency (range) which a value of each sample corresponds to. In addition, a frequency bin denotes a type of frame index indicating a frame (range) which a value of each sample corresponds to.

Detailed operations of the image feature information generation unit 110 are described below with reference to FIG. 2, and an example of the first DNN is described below with reference to FIG. 3.

The correction information generation unit 120 may generate correction information between an audio feature in the audio signal 102 and an image feature in the video signal from the video signal 101 and the two-dimensional audio signal 102. The audio feature in the two-dimensional audio signal 102 may denote a feature component corresponding to a movement of a sound source (corresponding to an object) in the audio. The correction information generation unit 120 may be implemented based on AI. The correction information generation unit 120 may extract a first altitude component and a first planar component, which correspond to the movement of an object (corresponding to a sound source) in the video from the video signal 101, based on a second DNN, and extract a second planar component corresponding to the movement of a sound source in the audio from the two-dimensional audio signal 102 not having an altitude component based on a third DNN. The correction information generation unit 120 may generate correction information corresponding to the second altitude component from the first altitude component, the first planar component, and the second planar component.

In other words, the correction information generation unit 120 may generate correction information from a video signal and a two-dimensional audio signal corresponding to the video signal by using the second DNN and the third DNN. An example of the second DNN and the third DNN is described below with reference to FIGS. 6A to 7.

The correction information generation unit 120 may synchronize the video signal 101 with the two-dimensional audio signal 102 and obtain feature information (corresponding to the first planar component) corresponding to a movement in a horizontal direction in the video and feature information (corresponding to the first altitude component) corresponding to a movement in a vertical direction in the image.

The correction information generation unit may obtain, from the two-dimensional audio signal, feature information (corresponding to the second planar component) corresponding to a movement in the horizontal direction in the audio.

Specifically, the correction information generation unit 120 may obtain, from the video signal 101 using a $(2\text{-}1^{st})$ DNN, N+M (N and M are integers greater than or equal to 1) pieces of feature map information corresponding to a movement in the horizontal direction in the video with respect to time. In other words, two-dimensional map information including a plurality of frame bin components and N+M feature components corresponding to a movement.

The correction information generation unit 120 may obtain, from the video signal 101 using a $(2\text{-}2^{nd})$ DNN, N+M (N and M are integers greater than or equal to 1) pieces of feature map information corresponding to a movement in the vertical direction in the video with respect to time. In other words, two-dimensional map information including a plurality of frame bin components and N+M feature components corresponding to a movement may be obtained.

An example of the $(2\text{-}1^{st})$ DNN and the $(2\text{-}2^{nd})$ DNN is described below with reference to FIGS. 6A and 6B.

The correction information generation unit 120 may obtain, from the two-dimensional audio signal 102 using the third DNN, feature map information corresponding to a movement in the horizontal direction in the video. In other words, two-dimensional map information including a plurality of frame bin components and N+M feature components corresponding to a movement may be obtained. An example of the third DNN is described below with reference to FIG. 7.

The correction information generation unit 120 may generate correction information for time based on feature information corresponding to a movement in the horizontal direction in the video, feature information corresponding to a movement in the vertical direction in the video, and feature information corresponding to a movement in the horizontal direction in the audio.

Specifically, the correction information generation unit 120 may obtain N+M pieces of correction map information with respect to time based on N+M pieces of feature map information corresponding to a movement in the horizontal and vertical directions in the image with respect to time and feature map information corresponding to a movement in the horizontal direction in the audio. In this case, a fourth value of N+M pieces of correction map information with respect to time may be obtained based on a proportional number set by considering a relationship between a first value of the feature map information corresponding to the movement in the horizontal direction in the image and a second value of the feature map information corresponding to the movement in the horizontal direction in the audio and a third value of a feature map corresponding to a movement in the vertical direction in the image, and N+M pieces of correction map information with respect to time including the fourth value may be generated.

The correction information generation unit 120 may perform frequency-related tiling on the correction information with respect to time and obtain correction information with respect to time and frequency. For example, the correction information generation unit 120 may obtain correction map information including a plurality of frame bin components, a plurality of frequency bin components, and N+M correction parameter components. In other words, the correction information generation unit 120 fills correction parameter components with the same value with respect to all frequency bins, so that three-dimensional correction map information having correction parameter (or referred to as a domain matching parameter), frame bin, and frequency bin components.

Detailed operations of the correction information generation unit 120 are described below with reference to FIG. 4.

The frequency conversion unit 125 may convert the two-dimensional audio signal 102 into a frequency domain two-dimensional audio signal according to various conversion methods, such as short time Fourier transform (STFT). The two-dimensional audio signal 102 includes samples divided according to a channel and time, and the frequency domain signal includes samples divided according to a channel, time, and frequency bin.

The three-dimensional audio output unit 130 may generate and output a three-dimensional audio signal based on the frequency domain two-dimensional audio signal, the image feature information (a plurality of pieces of feature information for time and frequency), and the correction information. The three-dimensional audio output unit 130 may be implemented based on AI. The three-dimensional audio output unit 130 may generate and output a three-dimensional audio signal based on the frequency domain two-dimensional audio signal, the image feature information (a plurality of pieces of feature information for time and frequency), and the correction information. An example of the fourth DNN is described below with reference to FIGS. 9 to 11.

The three-dimensional audio output unit 130 may perform a frequency conversion operation on a two-dimensional signal and obtain time and frequency information for 2-channel. However, the disclosure is not limited thereto, and as described above, when the frequency conversion unit 125 is separately present from the three-dimensional audio output unit 130, the frequency domain two-dimensional audio signal information may be obtained from the frequency conversion unit 125 without performing a frequency conversion operation.

The frequency domain two-dimensional audio signal information may include time (frame bin) and frequency information (frequency bin) for 2-channel. In other words, the frequency domain two-dimensional audio signal information may include sample information divided by a frequency bin and time.

The three-dimensional audio output unit 130 may generate audio feature information with respect to time and frequency from the time and frequency information for 2-channel. Specifically, the three-dimensional audio output unit 130 may generate N pieces of audio feature map information with respect to time and frequency from the time and frequency information for 2-channel using a $(4\text{-}1^{st})$ DNN. An example of the $(4\text{-}1^{st})$ DNN is described below with reference to FIG. 9.

The three-dimensional audio output unit 130 may generate audio/image integrated feature information based on audio feature information with respect to time and frequency (audio feature information for time and frequency) and image feature information with respect to time and frequency (image feature information for time and frequency). Specifically, the three-dimensional audio output unit 130 may generate N+M pieces of audio/image integrated feature map information based on M pieces of image feature map information with respect to time and frequency and N pieces of audio feature map information with respect to time and frequency.

The three-dimensional audio output unit 130 may generate a frequency domain three-dimensional audio signal for n-channel (n is an integer greater than 2) from the audio/image integrated feature map information. Specifically, the three-dimensional audio output unit 130 may generate a frequency domain three-dimensional audio signal for n-channel from the N+M pieces of audio/image integrated feature map information using a $(4\text{-}2^{nd})$ DNN. An example of the $(4\text{-}2^{nd})$ DNN is described below with reference to FIG. 10.

The three-dimensional audio output unit 130 may obtain audio correction information for n-channel based on the audio/image integrated feature information and correction information for time and frequency. Specifically, the three-dimensional audio output unit 130 may audio correction map information (correction information for frequency) for n-channel from the N+M pieces of audio/image integrated feature map information for time and frequency and the N+M pieces of correction map information for time and frequency.

The three-dimensional audio output unit 130 may perform correction on the frequency domain three-dimensional audio signal for n-channel based on the audio correction map information for n-channel, and obtain the corrected frequency domain three-dimensional audio signal for n-channel. In this case, a three-dimensional audio signal including the second altitude component may be output, and in particular, the second altitude component is an altitude component generated by correcting an altitude component included in the frequency domain three-dimensional audio signal for n-channel based on the correction information, and may thus be a component in which a movement of a sound source in the audio is well reflected. The three-dimensional audio output unit 130 may perform inverse frequency converting of the corrected frequency domain three-dimensional audio signal for n-channel and generate and output a three-dimensional audio signal for n-channel.

A detailed module and operation of the three-dimensional audio output unit 130 is described below with reference to FIG. 8.

The first DNN, the second DNN, the third DNN, and the fourth DNN may be trained according to a result of comparison between a first frequency domain training reconstruction three-dimensional audio signal reconstructed based on a first training two-dimensional audio signal and a first training image signal and a first frequency domain training three-dimensional audio signal obtained by frequency converting a first training three-dimensional audio signal. Training of the first DNN, the second DNN, the third DNN, and the fourth DNN is described below with reference to FIG. 12.

The correction information for time and frequency may be modified based on user (input) parameter information. In this case, the first DNN, the second DNN, the third DNN, and the fourth DNN may be trained according to a result of comparison between a frequency domain training reconstruction three-dimensional audio signal reconstructed based on the first training two-dimensional audio signal, the first training image signal, and the user parameter information and a first frequency domain training three-dimensional audio signal obtained by frequency converting the first training three-dimensional audio signal. Training of the first DNN, the second DNN, the third DNN, and the fourth DNN in further consideration of the user input parameter is described below with reference to FIG. 13.

The first training two-dimensional audio signal and the first training image signal may be obtained from the same apparatus as the video processing apparatus (or a training apparatus to be described below), or may be obtained from a portable terminal that is a different terminal connected to the video processing apparatus (or the training apparatus to be described below). The first training three-dimensional audio signal may be obtained from an ambisonic microphone included or mounted on the portable terminal. Acquisition of a training signal by a portable terminal is described below with reference to FIG. 16.

Parameter information of the first to third DNNs obtained as a result of the training of the first DNN, the second DNN, the third DNN, and the fourth DNN may be stored in the video processing apparatus or may be received from a terminal connected to the video processing apparatus (or the training apparatus to be described below).

The synchronization unit 140 may synchronize the video signal 101 with the three-dimensional audio signal 103 and output the synchronized three-dimensional audio signal and video signal. Hereinbelow, detailed modules of the image feature information generation unit 110, the correction information generation unit 120, and the three-dimensional audio output unit 130 included in the video processing apparatus 100, detailed operations thereof, and the first DNN to the fourth DNN included in the image feature information generation unit 110, the correction information generation unit 120, and the three-dimensional audio output unit 130 are described with reference to FIGS. 3 to 11.

Figure 2:
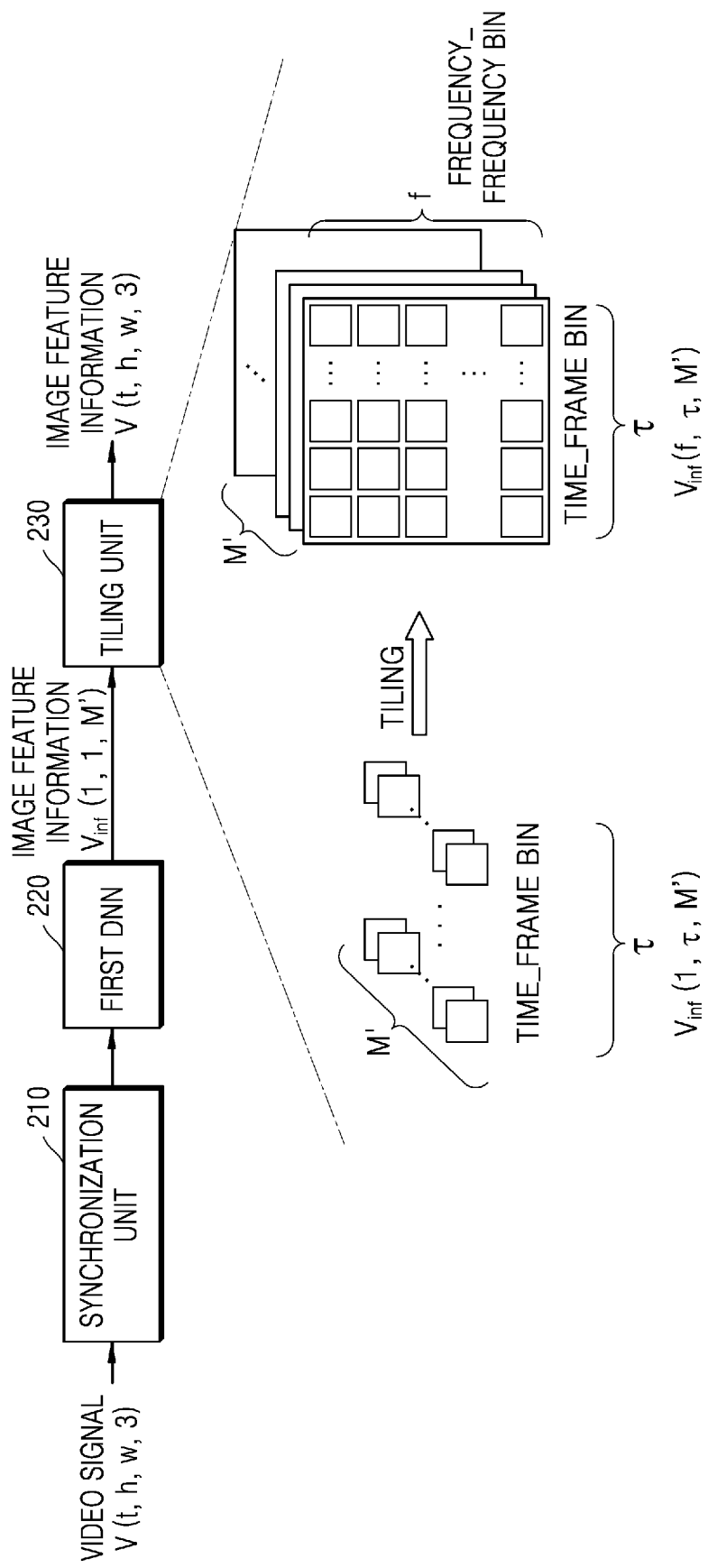
FIG. 2 is a diagram for describing a detailed operation of a video feature information generation unit according to an embodiment.

FIG. 2 is a diagram for describing a detailed operation of the image feature information generation unit 110 according to an embodiment.

Referring to FIG. 2, the image feature information generation unit 110 may include a synchronization unit 210, a first DNN 220, and a tiling unit 230.

First, the synchronization unit 210 may synchronize a video signal V (t, h, w, 3) with a two-dimensional audio signal. In other words, because a sampling frequency of the two-dimensional audio signal (for example, 48 kHz) and a sampling frequency (for example, 60 Hz) of the video signal (for example, 48 kHz) are different from each other, and in particular, the sampling frequency of an audio signal is significantly greater than a sampling frequency of a video signal, a synchronization operation for matching a sample of the two-dimensional audio signal with a sample (frame) of a video signal corresponding to the two-dimensional audio signal may be performed.

The first DNN 220 may be a DNN used to obtain image feature information $V_{inf}$ (1, 1, M') from the synchronized signal V (t, h, w, 3). In this case, the image feature information may be M' pieces of one-dimensional image feature information. The tiling unit 230 may accumulate the M' pieces of one-dimensional image feature information for each frame bin using the first DNN 220, so as to obtain M' pieces of two-dimensional image feature information $V_{inf}$(1, τ, and M') with respect to a plurality of frame bins (τ) (that is, time).

The tiling unit 230 may perform tiling for a frequency component on the M' pieces of two-dimensional image feature information $V_{inf}$ (1, τ, and M') with respect to a plurality of frame bins, so as to obtain three-dimensional image feature information $V_{inf}$(f, τ, and M') with respect to the plurality of frame bins (τ) (that is, time) and a plurality of frequency bins (f) (that is, frequency). In other words, by filling all frequency components with the same image feature value based on the two-dimensional image feature information $V_{inf}$ (1, τ, M'), the three-dimensional image feature information $V_{inf}$ (f, τ, M') may be obtained.

Figure 3:
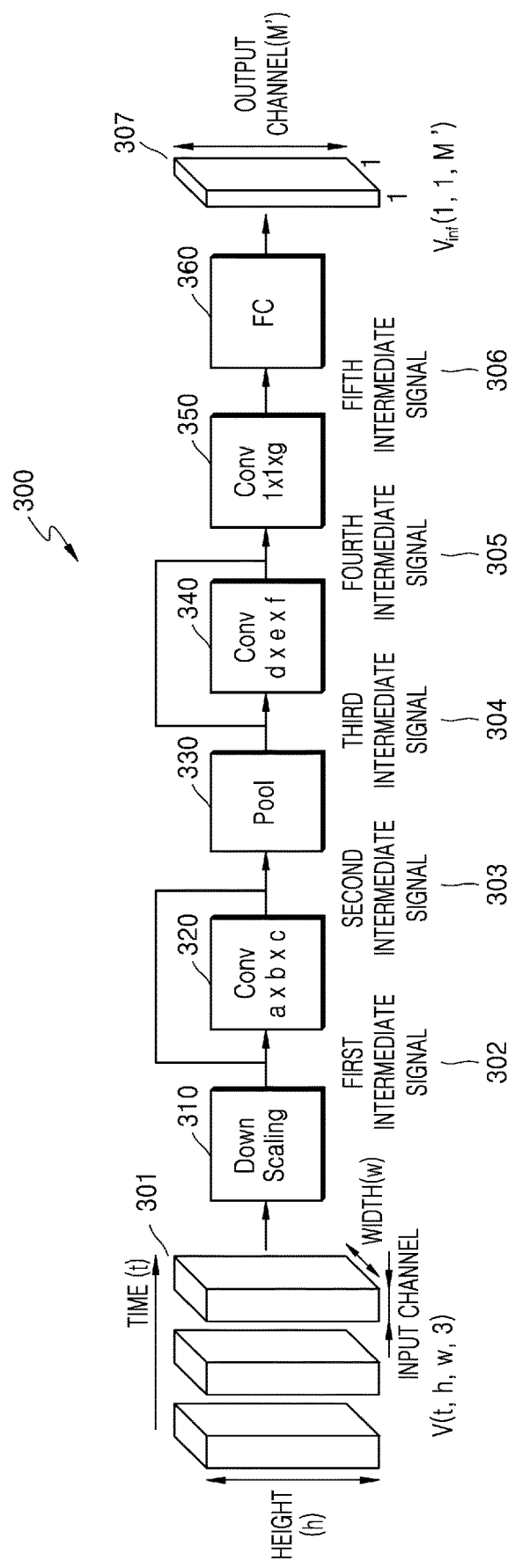
FIG. 3 is a diagram for describing a first deep neural network (DNN) according to an embodiment.

FIG. 3 is a diagram for describing a first DNN 300 according to an embodiment.

The first DNN 300 may include at least one convolution layer, a pooling layer, and a fully-connected layer. The convolution layer obtains feature data by processing input data with a filter of a predetermined size. Parameters of the filter of the convolution layer may be optimized through a training process described below. The pooling layer is a layer for taking and outputting feature values of only some of feature values of all samples of feature data in order to reduce a size of the input data, and may include a max pooling layer, an average pooling layer, and the like. The fully-connected layer is a layer in which neurons in one layer are connected to all neurons in the next layer, and is a layer for classifying features.

A downscaling layer, which is an example of the pooling layer, may mainly denote a pooling layer for reducing a data size of an input image before being input to the convolution layer.

Referring to FIG. 3, the first DNN 300 may include a downscaling layer 310, a first convolution layer 320, a pooling layer 330, a second convolution layer 340, a third convolution layer 340, and a first fully-connected layer 360. A video signal 301 is input to the first DNN 300. The video signal 301 includes samples divided according to an input channel, a time, a height, and a width. In other words, the video signal 301 may be four-dimensional data of the samples. Each of the samples of the video signal 301 may be a pixel value. An input channel of the video signal 301 is an RGB channel and may be 3, but is not limited thereto.

FIG. 3 shows that the size of the video signal 301 is (t, h, w, 3), which indicates that a time length of the video signal 301 is t, the number of input channels is 3, a height of the image is h, and a width of the image is w. The time length of t denotes that the number of frames is t, and each of the frames corresponds to a certain time period (for example, 5 ms). It is only an example that the size of the video signal 301 is (t, h, w, 3), and depending on the embodiment, the size of the video signal 301, the size of a signal input to each layer, and the size of a signal output from each layer may be variously modified. For example, h and w may be 224, but are not limited thereto.

As a result of processing of the downscaling layer 310, the video signal 301 may be downscaled and a first intermediate signal may be obtained. In other words, by the downscaling, the number of samples divided according to a height (h) and width (w) of the video signal 301 is reduced, and a height and width of the video signal 301 are reduced. For example, the height and width of the video signal 301 may be 112, but are not limited thereto.

The first convolution layer 320 processes the downscaled image signal (first intermediate signal) 302 with c filters of a size of a×b. For example, as a result of processing of the first convolution layer 320, a second intermediate signal 303 of a size of (112, 112, c) may be obtained. In this case, the first convolution layer 320 may include a plurality of convolution layers, and an input of a first layer and an output a second layer may be connected to each other and trained. The first layer and the second layer may be the same as each other. However, the disclosure is not limited thereto, and the second layer is a layer subsequent to the first layer. When the second layer is a layer subsequent to the first layer, an activation function of the first layer is Parametric Rectified Linear Unit (PReLU), and parameters of the activation function may be trained together.

By using the first pooling layer 330, pooling may be performed on the second intermediate signal 303. For example, as a result of processing of the pooling layer 330, a third intermediate signal 304 of a size (14, 14, c) may be obtained.

A second convolution layer 340 processes an input signal with f filters of a d×e size. As a result of processing of the second convolution layer 340, a fourth intermediate signal 305 of a (14, 14, f) size may be obtained.

The third convolution layer 350 may be a 1×1 convolution layer. The third convolution layer 350 may be used to adjust the number of channels. As a result of processing of the third convolution layer 350, a fifth intermediate signal 306 of a (14, 14, g) size may be obtained.

The first fully-connected layer 360 may classify input feature signals and output a one-dimensional feature signal. As a result of processing of the first fully-connected layer 360, an image feature signal 307 of a (1, 1, M') size may be obtained.

The first DNN 300 according to an embodiment of the disclosure obtains the image feature signal corresponding to a movement of an image object (corresponding to a sound source) from the video signal 301. In other words, although FIG. 3 shows that the first DNN 300 includes three convolution layers, one downscaling layer, one pooling layer, and one fully-connected layer, this is only an example, and when the image feature signal 307 including M image features may be obtained from the video signal 301, the number of convolution layer, the number of downscaling layers, the number of pooling layers, and the number of fully-connected layers, which are included in the first DNN 300, may be variously modified. Similarly, the number and sizes of filters used in each of the convolution layers may be variously modified, and a connection order and method between the layers may also be variously modified.

Figure 4:
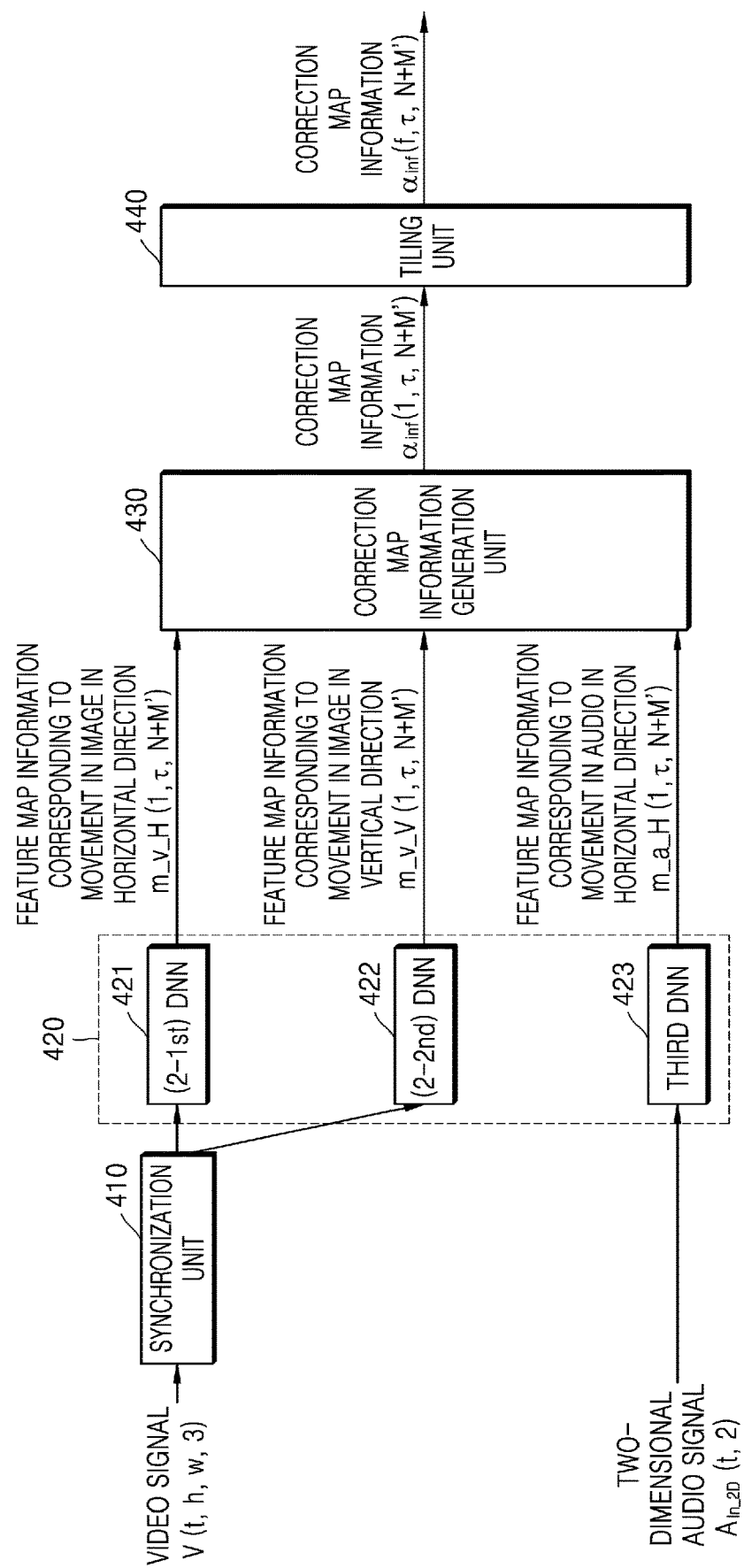
FIG. 4 is a diagram for describing a detailed description of a correction information generation unit according to an embodiment.

FIG. 4 is a diagram for describing a detailed operation of the correction information generation unit 120 according to an embodiment.

Referring to FIG. 4, the correction information generation unit 120 may include a synchronization unit 410, second and third DNNs 420, a correction map information generation unit 430, and a tiling unit 440.

Referring to FIG. 4, the synchronization unit 410 may synchronize a video signal V (t, h, w, 3) with a two-dimensional audio signal. In other words, a synchronization operation for matching a sample of the two-dimensional audio signal with a sample (frame) of a video signal corresponding to the two-dimensional audio signal may be performed.

The second and third DNNs 420 may include a (2-1$^{st}$) DNN 421, a (2-2$^{nd}$) DNN 422, and a third DNN 423. The (2-1$^{st}$) DNN 421 may be a DNN used to generate feature map information m_v_H (1, τ, N+M') corresponding to a movement of an image in the horizontal direction from the synchronized video signal V (t, h, w, 3). In this case, the feature map information corresponding to the movement of the image in the horizontal direction may be N+M' (N and M' are integers greater than or equal to 1) pieces of image feature information with respect to a two-dimensional time (frame bin).

The (2-2$^{nd}$) DNN 422 may be a DNN used to generate feature map information m_v_V (1, τ, N+M') (corresponding to the first altitude component) corresponding to a movement of the image in the vertical direction from the synchronized video signal V (t, h, w, 3). In this case, the feature map information corresponding to the movement of the image in the vertical direction may be N+M' (N and M' are integers greater than or equal to 1) pieces of image feature information with respect to a two-dimensional time (frame bin).

The third DNN 423 may be a DNN used to generate feature map information m_a_H (1, τ, N+M') (corresponding to the second planar component) corresponding to a movement of audio in the horizontal direction from a two-dimensional audio signal $A_{In\_2D}$ (t, 2). In this case, the feature map information corresponding to the movement of audio in the horizontal direction may be N+M' (N and M' are integers greater than or equal to 1) pieces of image feature information with respect to a two-dimensional time (frame bin).

The correction map information generation unit 430 may obtain correction map information $\alpha_{inf}$ (1, τ, N+M') from feature map information corresponding to a movement of an image in a horizontal direction m_v_H (1, τ, N+M'), feature map information corresponding to a movement of an image in the vertical direction m_v_V (1, τ, N+M'), and feature map information corresponding to a movement of audio in the horizontal direction m_1_H (1, τ, N+M'). Specifically, the correction map information generation unit 430 may obtain the correction map information $\alpha_{inf}$ (1, τ, N+M') according to [Mathematical Formula 1] shown below.

$$\alpha_{inf}(1, \tau, N + M') = \frac{m\_a\_H}{m\_v\_H} \times m\_v\_V \quad \text{[Mathematical Formula 1]}$$

[Mathematical Formula 1] is based on a theoretical background as described below. A theoretical background from which [Mathematical Formula 1] used to obtain a domain matching parameter $\alpha_{inf}$ is derived is described below with reference to FIGS. 5A to 5B.

Figure 5B:
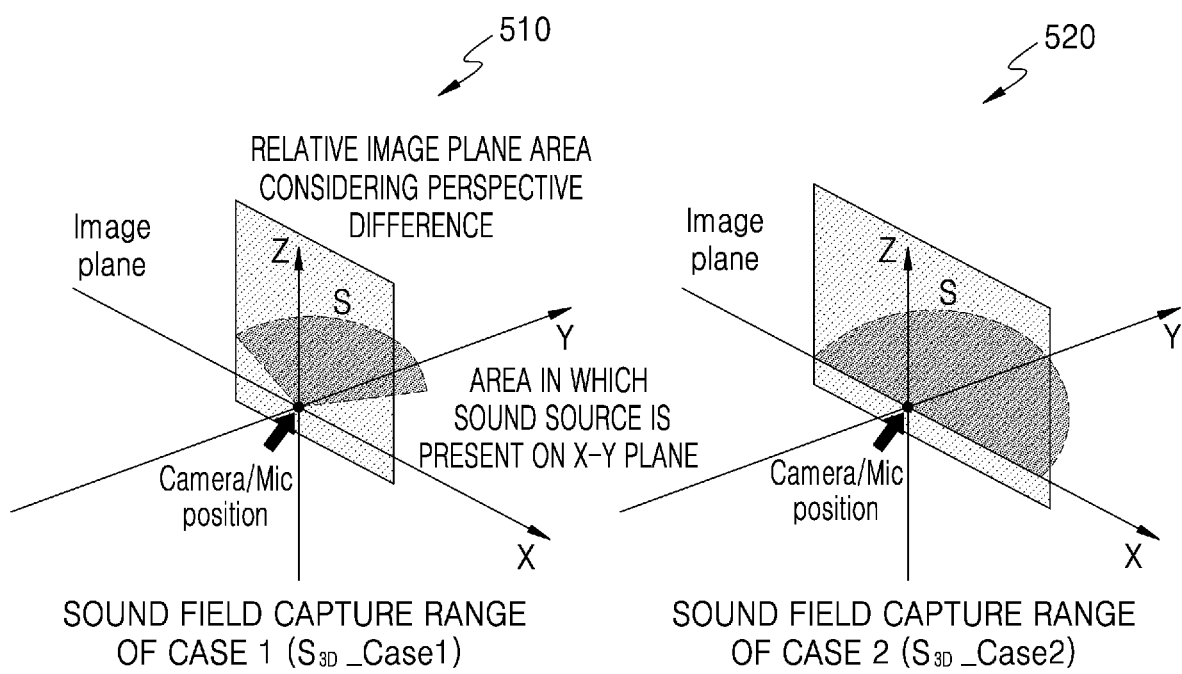

Referring to FIGS. 5A and 5B, even when pieces of movement information mv1 and mv2 of an object in an image are the same as each other as in case 1 510 and case 2 520, there may be a case where a degree of movement S of a sound source (corresponding to an object of the image) in the image in case 1 510 does not correspond to a degree of movement S of a sound source (corresponding to an object) of the image in case 2 520. This is because distortion occurs due to a difference in a degree of deformation of a depth-wise perspective for each image scene fundamentally included in an image sensor and a camera imaging system, and information of a sound source object in the image and movement information of a sound source in the audio do not fundamentally correspond to each other.

Accordingly, rather than using feature information corresponding to a movement of an object in the image as it is to generate three-dimensional audio, a correction parameter (or, a domain matching parameter) may be obtained to resolve the inconsistency of movement information.

In other words, in the movement information of the object in the image, movement information in the left-right directions (X-axis directions) and vertical direction (Z-axis direction) may be used, but movement information in the front-back directions (Y-axis direction) is uncertain. Thus, when the corresponding movement information is used as it is to generate three-dimensional audio, an error may be large.

In movement information of a sound source in audio, movement information in the left-right directions (X-axis direction) and front-back directions (Y-axis direction) may be used, but movement information in the vertical direction (Z-axis direction) may have uncertainty.

In order to resolve such inconsistency in movement information, a correction parameter may be obtained based on the movement information in the X-axis direction in which certainty exists in common.

In this case, through a comparison between relatively accurate X-axis direction information from among the movement information of the sound source in the audio and X-axis direction information from among the movement information of the object in the image, object movement information in the Z-axis direction in the image domain may be corrected (domain matching) according to the sound source movement information in the Z-axis direction in the audio domain. For example, information mv1_x and mv1_z in X-axis and Y-axis directions included in the movement information of the object in the image of case 1 510 is (10, 2) and information Smv1_x in the X-axis direction included in the movement information of the sound source in the audio of case 1 510 is 5, based on a proportional expression, information Smv1_y in the Z-axis direction of the sound source in the audio may be obtained as 1. Information mv1_x and mv1_z in the X-axis and Z-axis directions included in the movement information of the object in the image of case 2 520 is (10, 2) and information Smv1_x in the X-axis direction included in the movement information of the sound source in the audio of case 2 520 is 8, based on a proportional expression, information Smv1_y in the Z-axis direction of the sound source in the audio may be obtained as 1.6. In other words, based on a proportional expression of Smv1_x: mv1_x=Smv1_z: mv1_z, it may be Smv1_z=Smv1_x*mv1_z/mv1_x. In this case, a value of Smv1_z may be used as a correction parameter.

Based on the correction parameter derivation method described above, [Mathematical Formula 1] described above may be derived. The tiling unit 440 may obtain correction map information $\alpha_{inj}(f, t, N+M')$ by performing tiling for a frequency component on two-dimensional N+M' correction map information received from the correction map information generation unit 430. In other words, by filling all frequency components with the same image feature value based on the two-dimensional correction map information $\alpha_{inj}(f, t, N+M')$, three-dimensional correction map information $\alpha_{inj}(1, t, N+M')$ may be obtained.

Figure 5C:
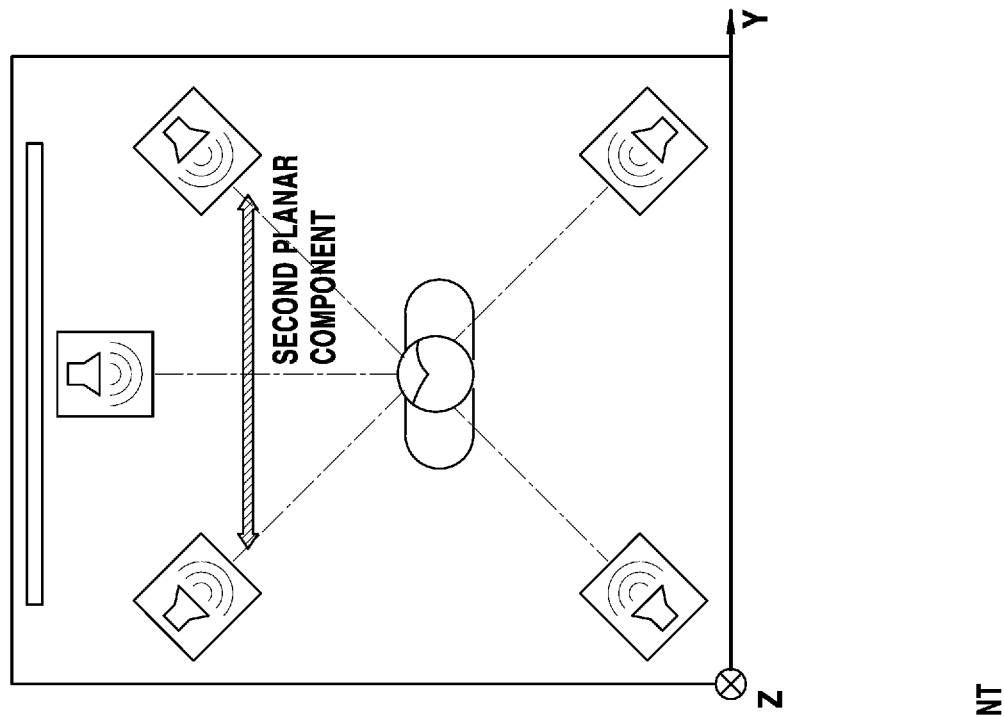
FIG. 5C is a diagram for describing an algorithm for estimating an altitude component of a sound source within an audio signal, which is necessary for generating a three-dimensional audio signal by analyzing a movement of an object within a video signal and a movement of a sound source within a two-dimensional audio signal.
Figure 5C:
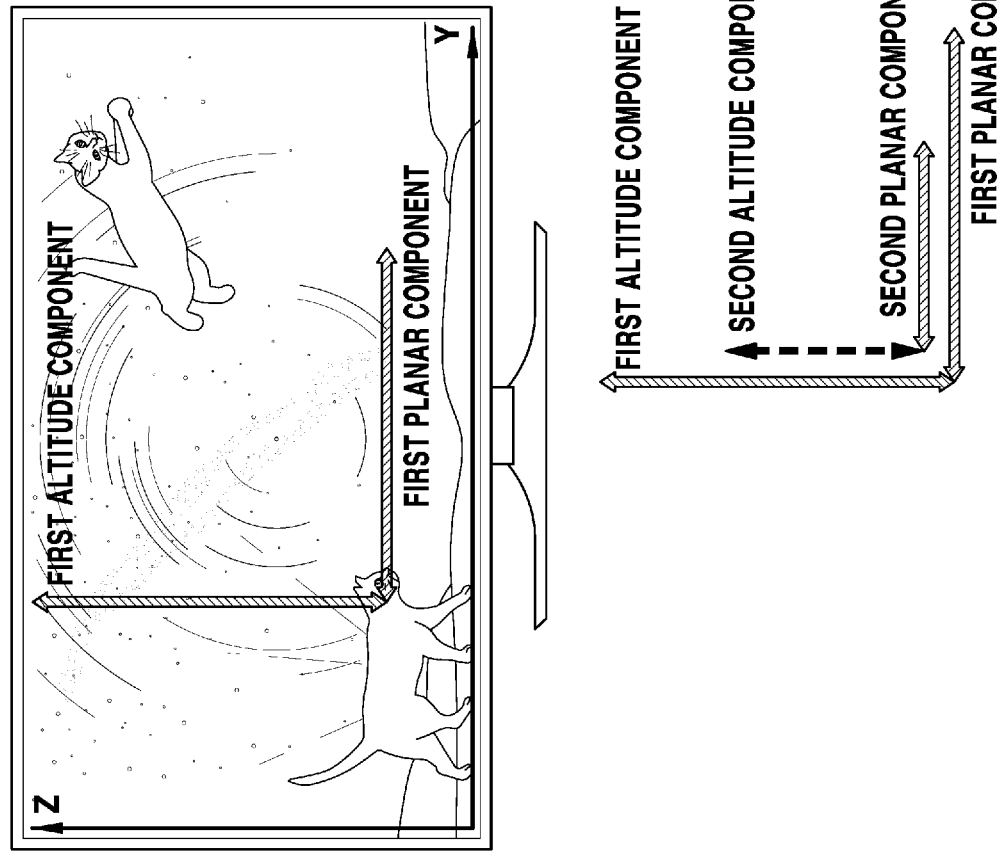

FIG. 5C is a diagram for describing an algorithm for estimating an altitude component of a sound source in an audio signal, which is necessary for analyzing a movement of an object in a video signal and a movement of a sound source in a two-dimensional audio and generating a three-dimensional audio signal.

Referring to FIG. 5C, the video processing apparatus 100 may analyze a video signal and extract feature information related to a first altitude component and a first planar component related to movement of an object in a video. The video processing apparatus 100 may analyze a two-dimensional audio signal and extract feature information related to a second planar component related to movement of a sound source in the two-dimensional audio signal. The video processing apparatus 100 may estimate second altitude component feature information related to movement of a sound source based on first altitude component, first planar component, and second planar component feature information. The video processing apparatus 100 may output a three-dimensional audio signal including the second altitude component from the two-dimensional audio signal based on the feature information related to the second altitude component. In this case, the feature information related to the second altitude component may correspond to the correction map information described above with reference to FIG. 4.

Figure 6A:
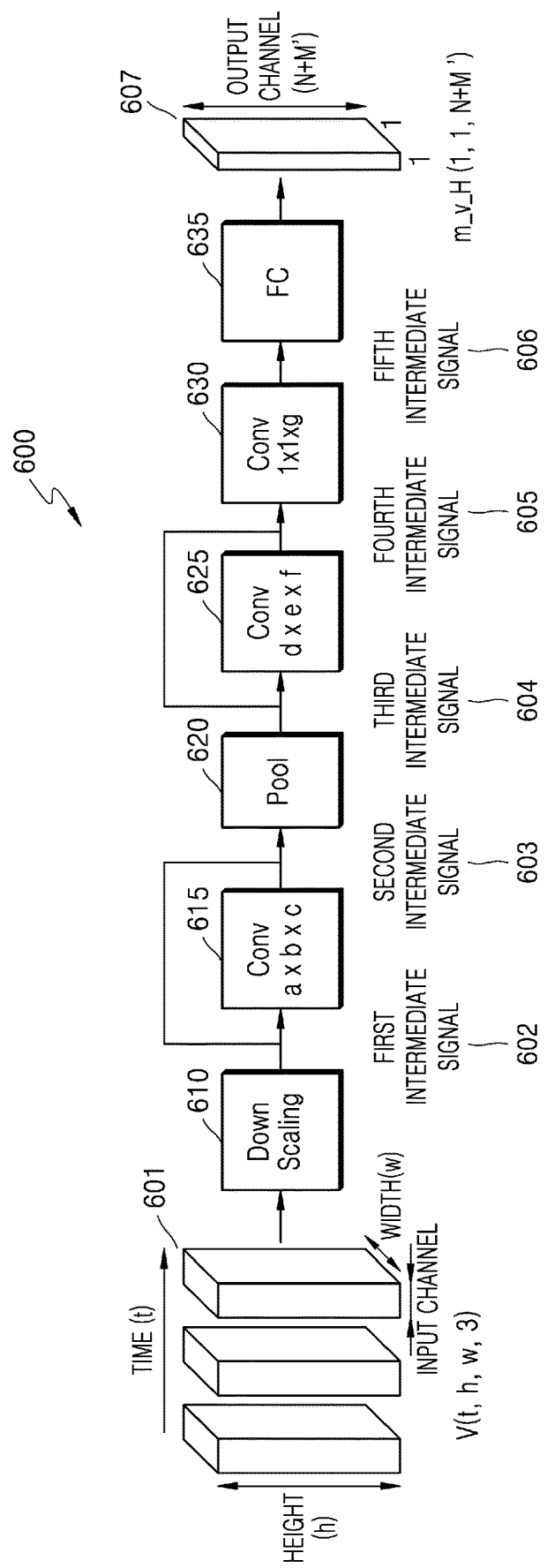
FIG. 6A is a diagram for describing a (2-$1^{st}$) DNN 600.

FIG. 6A is a diagram for describing a $(2\text{-}1^{st})$ DNN 600.

The $(2\text{-}1^{st})$ DNN 600 may include at least one convolution layer, a pooling layer, and a fully-connected layer. A downscaling layer is an example of a pooling layer, and may mainly denote a pooling layer for reducing a data size of an input image before being input to a convolution layer. The $(2\text{-}1^{st})$ DNN 600 may include a downscaling layer 610, a first convolution layer 615, a pooling layer 620, a second convolution layer 625, a third convolution layer 630, and a first fully-connected layer 635.

Referring to FIG. 6A, a video signal 601 is input to the $(2\text{-}1^{st})$ DNN 600. The video signal 601 includes samples divided according to an input channel, a time, a height, and a width. In other words, the video signal 601 may be four-dimensional data of the samples.

A size of the video signal 601 being (t, h, w, 3) is only an example, and depending on the embodiment, a size of the video signal 601, a size of a signal input to each layer, and a size of a signal output from each layer may be variously modified. For example, h and w may be 224, but are not limited thereto.

A first intermediate signal 602 is obtained by downscaling the video signal 601 by using a downscaling layer 610. In other words, by the downscaling, the number of samples divided according to a height (h) and width (w) of the video signal 601 is reduced, and a height and width of the video signal 601 is reduced. For example, a height and width of the first intermediate signal 602 may be 112, but are not limited thereto.

The first convolution layer 615 processes the downscaled image signal with c filters of an a×b size. In this case, in order to obtain a feature component corresponding to movement in the horizontal direction, a filter in the horizontal direction of a 3×1 size may be used. For example, as a result of processing of the first convolution layer 615, a second intermediate signal 603 of a (112, 112, c) size may be obtained. In this case, the first convolution layer 615 may include a plurality of convolution layers, and an input of a first layer and an output of a second layer may be connected to each other and trained. The first layer and the second layer may be the same layer, but are not limited thereto, and the second layer may be a layer subsequent to the first layer. When the second layer is a layer subsequent to the first layer, an activation function of the first layer is PReLU, and a parameter of the activation function may be trained together.

Pooling may be performed on the second intermediate signal 603 by using a first pooling layer 620, so that a third intermediate signal 604 may be obtained. For example, as a result of processing of the pooling layer 620, the third intermediate signal (14, 14, c) may be obtained, but is not limited thereto.

The second convolution layer 625 may process an input signal with f filters of a d×e size, so that a fourth intermediate signal 605 may be obtained. As a result of processing of the second convolution layer 625, the fourth intermediate signal 605 of a (14, 14, f) size may be obtained, but is not limited thereto.

The third convolution layer 630 may be a 1×1 convolution layer. The third convolution layer 630 may be used to adjust the number of channels. As a result of processing of the third convolution layer 630, a fifth intermediate signal 606 of a (14, 14, g) size may be obtained, but is not limited thereto.

The first fully-connected layer 635 may output a one-dimensional feature signal by classifying input feature signals. As a result of processing of the first fully-connected layer 635, a feature component signal 607 of a (1, 1, N+M') size corresponding to a movement in the horizontal direction may be obtained.

The (2-1$^{st}$) DNN 600 according to an embodiment obtains the image feature signal 607 corresponding to the movement of the image object (corresponding to the sound source) in the horizontal direction from the video signal 601. In other words, although FIG. 6A shows that the (2-1$^{st}$) DNN 600 includes three convolution layers, one downscaling layer, one pooling layer, and one fully-connected layer, this is only an example, and if the image feature signal 607 including N+M' image features in the horizontal direction may be obtained from the video signal 601, the number of convolution layers, the number of downscaling layers, the number of pooling layers, and the number of fully-connected layers, which are included in the (2-1$^{st}$) DNN 600, may be variously modified. Similarly, the number and sizes of filters used in each of the convolution layers may be variously modified, and a connection order and method between the layers may also be variously modified.

Figure 6B:
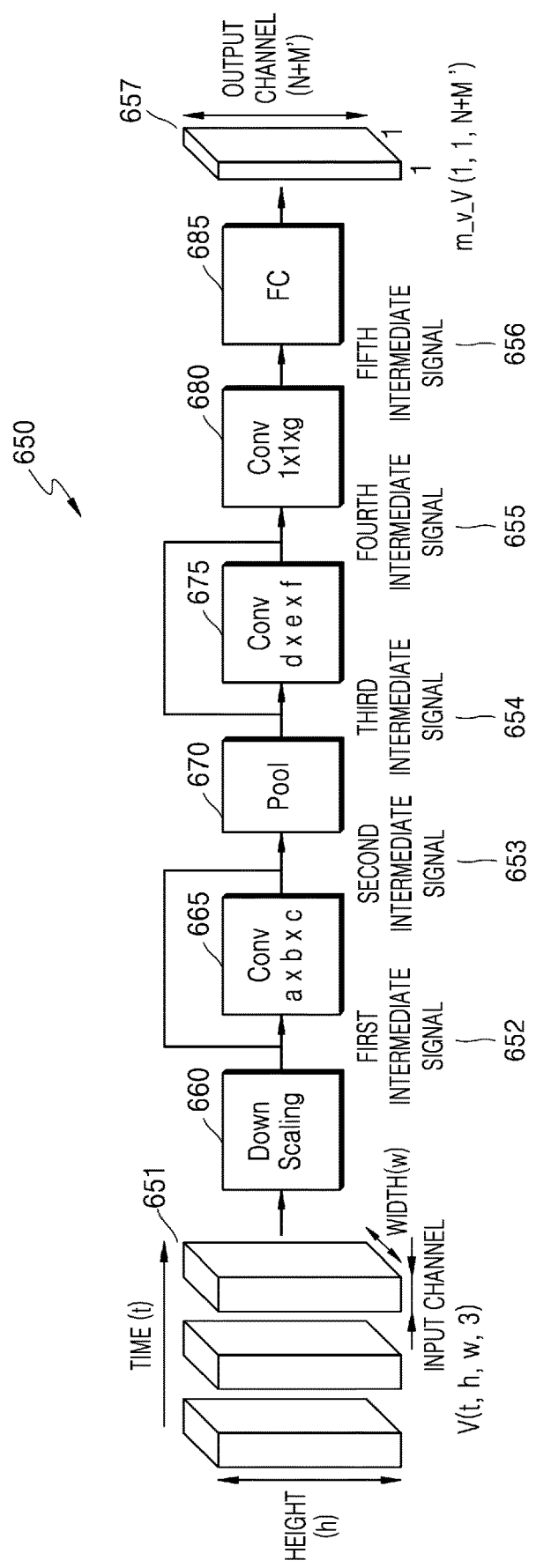
FIG. 6B is a diagram for describing a (2-$2^{nd}$) DNN.

FIG. 6B is a diagram for describing a (2-2$^{nd}$) DNN 650.

The (2-2$^{nd}$) DNN 650 may include at least one convolution layer, a pooling layer, and a fully-connected layer. A downscaling layer is an example of a pooling layer and may mainly denote a pooling layer for reducing a data size of an input image before being input to a convolution layer. The (2-2$^{nd}$) DNN 650 may include a downscaling layer 660, a first convolution layer 665, a pooling layer 670, a second convolution layer 675, a third convolution layer 680, and a first fully-connected layer 685.

Referring to FIG. 6B, a video signal 651 is input to the (2-2$^{nd}$) DNN 650. The video signal 651 includes samples divided according to an input channel, a time, a height, and a width. In other words, the video signal 651 may be four-dimensional data of the samples.

A size of the video signal 651 being (t, h, w, 3) is only an example, and depending on the embodiment, a size of the video signal 651, a size of a signal input to each layer, and a size of a signal output from each layer may be variously modified. For example, h and w may be 224. The disclosure is not limited thereto.

A first intermediate signal 652 is obtained by downscaling the video signal 651 by using the downscaling layer 660. In other words, by the downscaling, the number of samples divided according to a height (h) and width (w) of the video signal 651 is reduced, and a height and width of the video signal 651 is reduced. For example, a height and width of the first intermediate signal 652 may be 112, but are not limited thereto.

The first convolution layer 665 processes the downscaled image signal with c filters of an a×b size. In this case, in order to obtain a feature component corresponding to a movement in the vertical direction, a filter of a 1×3 size in the vertical direction may be used. For example, as a result of processing of the first convolution layer 665, a second intermediate signal 653 of a (112, 112, c) size may be obtained. In this case, the first convolution layer 665 may include a plurality of convolution layers, and an input of a first layer and an output of a second layer may be connected to each other and trained. The first layer and the second layer may be the same layer. However, the disclosure is not limited thereto, and the second layer may be a layer subsequent to the first layer. When the second layer is a layer subsequent to the first layer, an activation function of the first layer is PReLU, and a parameter of the activation function may be trained together.

Pooling may be performed on the second intermediate signal 653 by using a first pooling layer 670. For example, as a result of processing of the pooling layer 670, a third intermediate signal of a size (14, 14, c) may be obtained, but is not limited thereto.

A second convolution layer 675 processes an input signal with f filters of a d×e size, so that a fourth intermediate signal 655 may be obtained. As a result of processing of the second convolution layer 675, the fourth intermediate signal of a (14, 14, f) size may be obtained, but the disclosure is not limited thereto.

A third convolution layer 680 may be a 1×1 convolution layer. The third convolution layer 680 may be used to adjust the number of channels. As a result of processing of the third convolution layer 680, a fifth intermediate signal 656 of a (14, 14, g) size may be obtained.

The first fully-connected layer 685 may output a one-dimensional feature signal by classifying input feature signals. As a result of processing of the first fully-connected layer 685, a feature component signal 657 of a (1, 1, N+M') size corresponding to a movement in the horizontal direction may be obtained.

The (2-2$^{nd}$) DNN 650 according to an embodiment of the disclosure obtains, from the video signal 651, the image feature signal 657 corresponding to a movement of an image object (sound source) in the vertical direction. In other words, although FIG. 6B shows that the (2-2$^{nd}$) DNN 650 includes three convolution layers, one downscaling layer, one pooling layer, and one fully-connected layer, this is only an example, and if the image feature signal 657 including N+M' image features in the horizontal direction may be obtained from the video signal 651, the number of convolution layers, the number of downscaling layers, the number of pooling layers, the number of fully-connected layers, which are included in the first DNN 600, may be variously modified. Similarly, the number of sizes of filters used in each of the convolution layers may be variously modified, and a connection order and method between each layer may also be variously modified.

Figure 7:
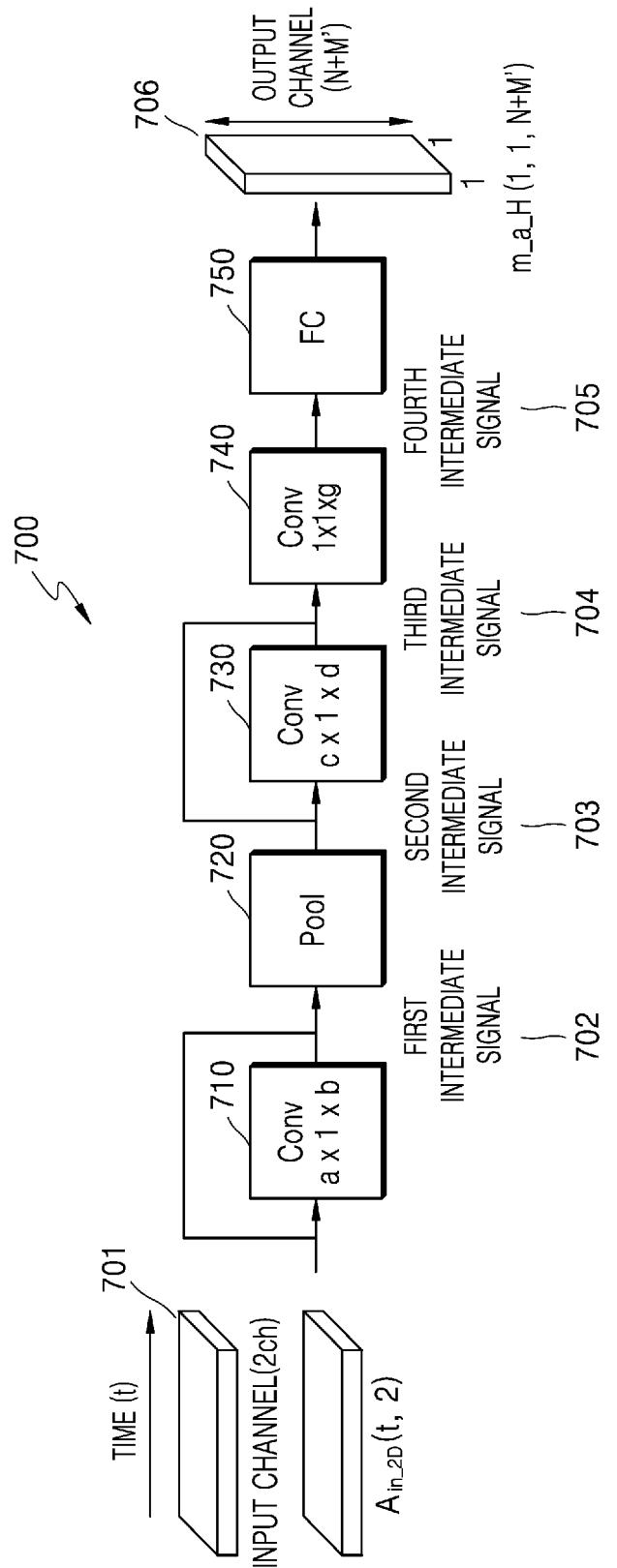
FIG. 7 is a diagram for describing a third DNN.

FIG. 7 is a diagram for describing a third DNN 700.

The third DNN 700 may include at least one convolution layer, a pooling layer, and a fully-connected layer. A downscaling layer is an example of a pooling layer and may mainly denote a pooling layer for reducing a data size of an input image before being into a convolution layer. The third DNN 700 may include a first convolution layer 710, a pooling layer 720, a second convolution layer 730, a third convolution layer 740, and a first fully-connected layer 750.

Referring to FIG. 7, a two-dimensional audio signal 701 is input to the third DNN 700. The two-dimensional audio signal 701 includes samples divided into an input channel and a time. In other words, the two-dimensional audio signal 701 may be two-dimensional data of the samples. Each of the samples of the two-dimensional audio signal 701 may be an amplitude. An input channel of the two-dimensional audio signal 701 may be a 2-channel, but is not limited thereto.

FIG. 7 shows that a size of the two-dimensional audio signal 701 is (t, 2), but this indicates that a time length of the two-dimensional audio signal 701 is t, and the number of input channels is two. A size of the two-dimensional audio signal 701 being (t, 2) is only an example, and depending on the embodiment, a size of the two-dimensional audio signal 701, a size of a signal input to each layer, and a size of a signal output from each layer may be variously modified.

The first convolution layer 710 processes the two-dimensional audio signal 701 with b filters (one-dimensional filters) of an a×1 size. For example, as a result of processing of the first convolution layer 710, a first intermediate signal 702 of a (512, 1, b) size may be obtained. In this case, the first convolution layer 710 may include a plurality of convolution layers, and an input of a first layer and an output of a second layer may be connected to each other and trained. The first layer and the second layer may be the same layer. However, the disclosure is not limited thereto, and the second layer may be a layer subsequent to the first layer. When the second layer is a layer subsequent to the first layer, an activation function of the first layer is a PReLU, and a parameter of the activation function may be trained together.

Pooling may be performed on the first intermediate signal 702 by using the pooling layer 720. For example, as a result of processing of the pooling layer 720, a second intermediate signal 703 of a (28, 1, b) size may be obtained.

The second convolution layer 730 processes an input signal with d filters of a c×1 size. As a result of processing of the second convolution layer 730, a third intermediate signal 704 of a (28, 1, d) size may be obtained.

The third convolution layer 740 may be a 1×1 convolution layer. The third convolution layer 740 may be used to adjust the number of channels. As a result of processing of the third convolution layer 740, a fourth intermediate signal 705 of a (28, 1, g) size may be obtained.

The first fully-connected layer 750 may output a one-dimensional feature signal by classifying input feature signals. As a result of processing of the first fully-connected layer 750, a feature component signal 706 corresponding to a movement in the horizontal direction of a (1, 1, N+M') may be obtained.

The third DNN 700 according to an embodiment of the disclosure obtains an audio feature signal 706 corresponding to a movement of a two-dimensional audio sound source (corresponding to an object in the video) in the horizontal direction from the two-dimensional audio signal 701. In other words, although FIG. 7 shows that the third DNN 700 includes three convolution layers, one pooling layer, and one fully-connected layer, this is only an example, and when the audio feature signal 706 including N+M' audio features in the horizontal direction may be obtained from the two-dimensional audio signal 701, the number of convolution layers, the number of pooling layers, the number of fully-connected layers, which are included in the third DNN 700, may be variously modified. Similarly, the number and sizes of filters used in each of the convolution layers may be variously modified, and a connection order and method between the layers may also be variously modified.

Figure 8:
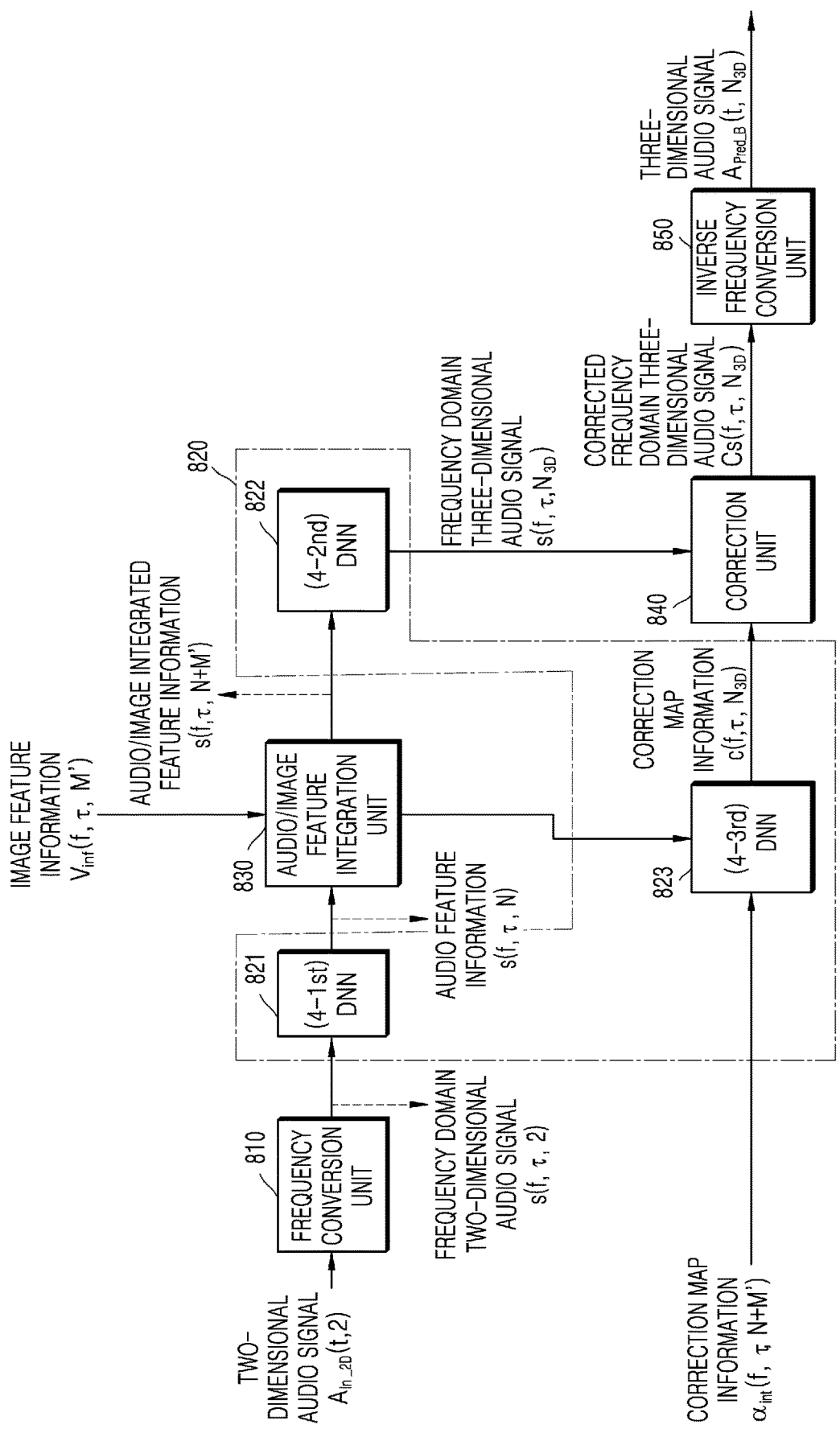
FIG. 8 is a diagram for describing a detailed operation of a three-dimensional audio output unit according to an embodiment.

FIG. 8 is a diagram for describing a detailed operation of the three-dimensional audio output unit 130 according to an embodiment.

Referring to FIG. 8, the three-dimensional audio output unit 130 may include a frequency conversion unit 810, a (4-1$^{st}$) DNN 821, an audio/image feature integration unit 830, (4-2$^{nd}$) DNN 822, a (4-3$^{rd}$) DNN 823, a correction unit 840, and an inverse frequency conversion unit 850.

The frequency conversion unit 810 may obtain a frequency domain two-dimensional audio signal s(f, τ, 2) by performing frequency conversion on a two-dimensional audio signal $A_{In\_2D}$(t, 2). However, as described above, when the frequency domain two-dimensional audio signal s(f, τ, 2) is received from the frequency conversion unit 125, the frequency conversion unit 810 may not be included.

The (4-1$^{st}$) DNN 821 may be a DNN used to generate audio feature information s(f, τ, N) from the frequency domain two-dimensional audio signal s(f, τ, 2). In this case, the audio feature information may be N pieces of one-dimensional audio feature information.

The audio/image feature integration unit 830 may generate audio/image integrated feature information s(f, τ, N+M') by integrating image feature information $V_{inf}$(f, τ, M') with the audio feature information s(f, τ, N). For example, because the image feature information is the same as the audio feature information in terms of sizes of frequency bin and frame bin components, the audio/image feature integration unit 830 may generate audio/image integrated feature information by superimposing image feature map information on the audio feature information, but is not limited thereto.

The (4-2$^{nd}$) DNN 822 may be a DNN used to generate a frequency domain three-dimensional audio signal s(f, τ, $N_{3D}$) from the audio/image integrated feature information s(f, τ, N+M'). In this case, $N_{3D}$ may denote the number of channels of three-dimensional audio.

The (4-3$^{rd}$) DNN 823 may obtain correction map information c(f, τ, $N_{3D}$) based on the audio/image integrated feature information s(f, τ, N+M') and correction map information $α_{inf}$(f, τ, N+M').

The correction unit 840 may obtain a corrected frequency domain three-dimensional audio signal Cs(f, τ, $N_{3D}$) based on the frequency domain three-dimensional audio signal s(f, τ, $N_{3D}$) and the correction map information c(f, τ, $N_{3D}$). For example, the correction unit 840 may obtain the corrected frequency domain three-dimensional audio signal Cs(f, τ, $N_{3D}$) by adding a sample value of the correction map information c(f, τ, $N_{3D}$) to a sample value of the frequency domain three-dimensional audio signal s(f, τ, $N_{3D}$). By correcting (matching an image domain with an audio domain) an uncertain altitude component corresponding to a movement of a sound source in the frequency domain three-dimensional audio signal through the correction unit 840, the output frequency domain three-dimensional audio signal may have a more certain altitude component in the frequency domain three-dimensional audio signal.

The inverse frequency conversion unit 850 may output a three-dimensional audio signal $A_{Pred\_B}$(t, $N_{3D}$) by performing inverse frequency conversion on the corrected frequency domain three-dimensional audio signal Cs(f, τ, $N_{3D}$).

Figure 9:
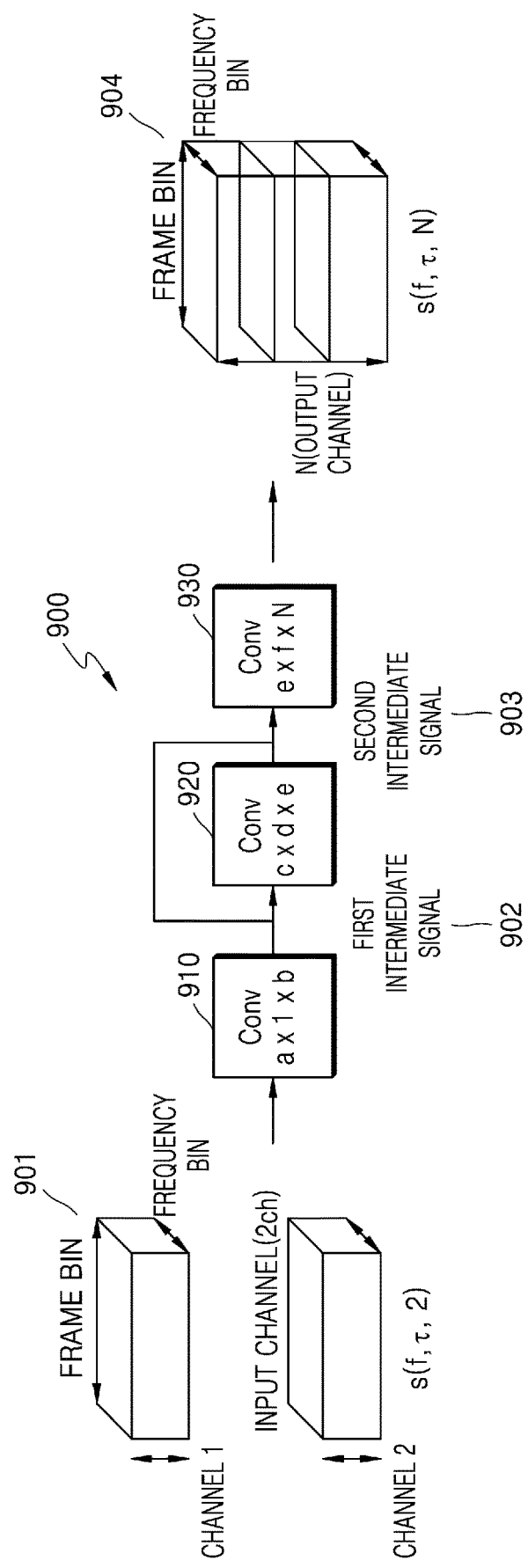
FIG. 9 is a diagram for describing a (4-$1^{st}$) DNN according to an embodiment.

FIG. 9 is a diagram for describing a (4-1$^{st}$) DNN 900 according to an embodiment.

The (4-1$^{st}$) DNN 900 may include at least one convolution layer. The convolution layer obtains audio feature data by processing input data with a filter of a predetermined size. Parameters of the filter of the convolution layer may be optimized through a training process described below. The (4-1$^{st}$) DNN 900 may include a first convolution layer 910, a second convolution layer 920, and a third convolution layer 930.

Referring to FIG. 9, a frequency domain two-dimensional audio signal 901 is input to the (4-1$^{st}$) DNN 900. The frequency domain two-dimensional audio signal 901 may include samples divided according to an input channel, a frame bin, and a frequency bin. In other words, the frequency domain two-dimensional audio signal 901 may be three-dimensional data of the samples. Each of the samples of the frequency domain two-dimensional audio signal 901 may be a frequency domain two-dimensional audio signal value. The input channel of the frequency domain two-dimensional audio signal 901 may be a 2-channel, but is not limited thereto.

FIG. 9 shows that a size of the frequency domain two-dimensional audio signal 901 is (f, τ, 2), where a time length (the number of frame bins) of the frequency domain two-dimensional audio signal 901 may be τ, the number of input channels may be 2, and the number of frequency bins may be f. Depending on the embodiment, a size of the frequency domain two-dimensional audio signal 901, a size of a signal input to each layer, and a size of a signal output from each layer may be variously modified.

The first convolution layer 910 processes the frequency domain two-dimensional audio signal 901 with c filters of an a×b size. For example, as a result of processing of the first convolution layer 910, a first intermediate signal of a (f, τ, 32) size may be obtained.

The second convolution layer 920 processes the first intermediate signal 902 with e filters of a c×d size. For example, as a result of processing of the first convolution layer, a second intermediate signal 903 of a (f, τ, 32) size may be obtained.

In this case, the second convolution layer 920 may include a plurality of convolution layers, and an input of the first layer and an output of the second layer may be connected to each other and trained. The first layer and the second layer may be the same layer. However, the disclosure is not limited thereto, and the second layer may be a layer subsequent to the first layer. When the second layer is a layer subsequent to the first layer, an activation function of the first layer is PReLU, and a parameter of the activation function may be trained together.

The third convolution layer 930 processes the input second intermediate signal 903 with N filters of an e×f size. As a result of processing of the third convolution layer 930, audio feature information 904 of a (f, τ, N) may be obtained.

The (4-1$^{st}$) DNN 900 according to an embodiment of the disclosure obtains the audio feature signal 904 corresponding to a movement of audio (a sound source) in the horizontal direction) from the frequency domain two-dimensional audio signal 901. In other words, although FIG. 9 shows that the (4-1$^{st}$) DNN 900 includes three convolution layers, this is only an example, and if the audio feature signal 904 including N audio features may be obtained from the frequency domain two-dimensional audio signal 901, the number of convolution layers included in the frequency domain two-dimensional audio signal 901 may be variously modified. Similarly, the number and sizes of filters used in each of the convolution layers may be variously modified, and a connection order and method between each layer may also be variously modified.

Figure 10:
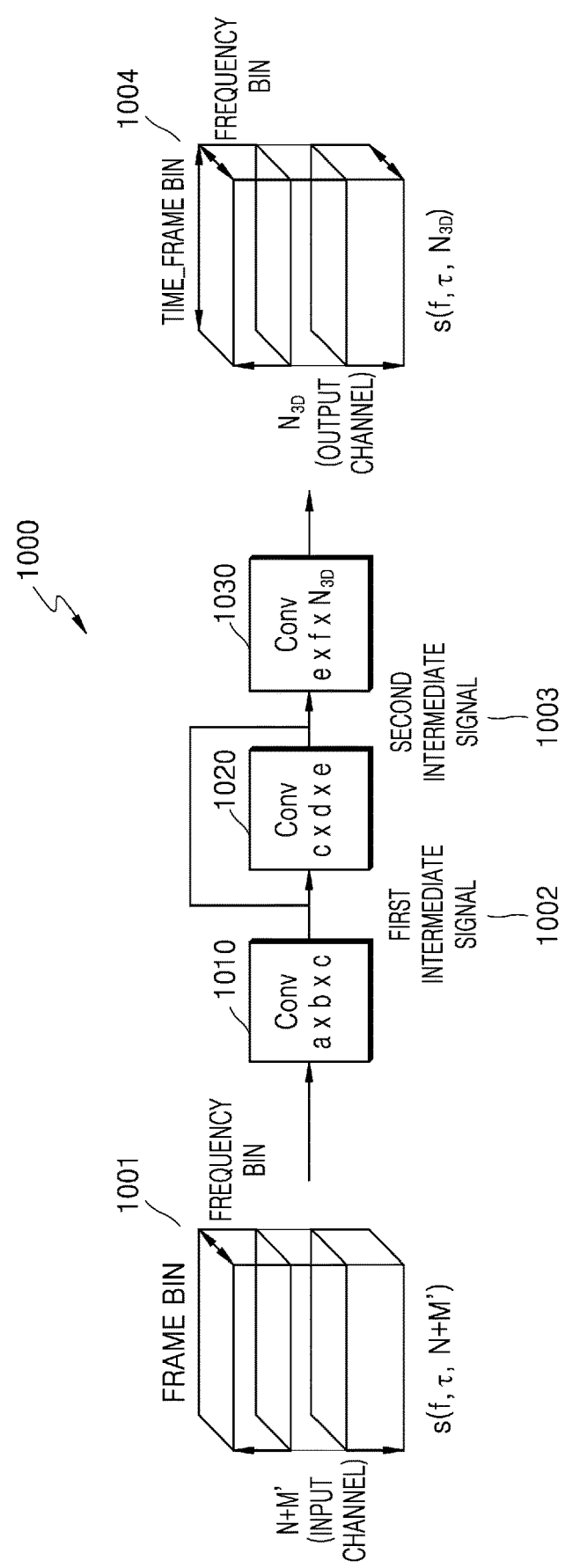
FIG. 10 is a diagram for describing a (4-$2^{nd}$) DNN according to an embodiment.

FIG. 10 is a diagram for describing a (4-2$^{nd}$) DNN 1000 according to an embodiment.

The (4-2$^{nd}$) DNN 1000 may include at least one convolution layer. The convolution layer obtains audio feature data by processing input data with a filter of a predetermined size. Parameters of the filter of the convolution layer may be optimized through a training process described below. The (4-2$^{nd}$) DNN 1000 may include a first convolution layer 1010, a second convolution layer 1020, and a third convolution layer 1030.

Referring to FIG. 10, audio/image integrated feature information 1001 is input to the (4-2$^{nd}$) DNN 1000. The audio/image integrated feature information 1001 includes divided according to the number of features, a time (frame bin), and a frequency bin. In other words, the audio/image integrated feature information 1001 may be three-dimensional data of the samples. In other words, each of the samples of the audio/image integrated feature information 1001 may be an audio/image integrated feature value.

FIG. 10 shows that a size of the audio/image integrated feature information 1001 is (f, τ, N+M'), where a time length (frame bin) of the audio/image integrated feature information 1001 may be τ, and the number of features corresponding to the frame bin and the frequency bin may be N+M', and the number of frequency bins may be f. Depending on the embodiment, a size of the audio/image integrated feature information 1001, a size of a signal input to each layer, and a size of a signal output from each layer may be variously modified.

The first convolution layer 1010 processes the audio/image integrated feature information 1001 with c filters of an a×b size. For example, as a result of processing of the first convolution layer 1010, a first intermediate signal 1002 of a (f, τ, c) size may be obtained.

The second convolution layer 1020 processes the first intermediate signal 1002 with e filters of a c×d size. For example, as a result of processing of the second convolution layer 1020, a second intermediate signal 1003 of a (f, τ, e) size may be obtained.

In this case, the second convolution layer 1020 may include a plurality of convolution layers, and an input of the first layer and an output of the second layer may be connected to each other and trained. The first layer and the second layer may be the same layer. However, the disclosure is not limited thereto, and the second layer may be a layer subsequent to the first layer. When the second layer is a subsequent layer of the first layer, an activation function of the first layer is PReLU, and a parameter of the activation function may be trained together.

The third convolution layer 1030 processes an input signal with N$_{3D}$ filters of an e×f size. As a result of processing of the third convolution layer 1030, a frequency domain three-dimensional audio signal 1004 of a (f, τ, N$_{3D}$) size may be obtained.

The (4-2$^{nd}$) DNN 1000 according to an embodiment of the disclosure obtains the frequency domain three-dimensional audio signal 1004 from the audio/image integrated feature information 1001. In other words, although FIG. 10 shows that the (4-2$^{nd}$) DNN 1000 includes three convolution layers, this is only an example, and if the frequency domain three-dimensional audio signal 1004 may be obtained from the audio/image integrated feature information 1001, the number of convolution layers included in the (4-2$^{nd}$) DNN 1000 may be variously modified. Similarly, the number and sizes of filters used in each of the convolution layers may be variously modified, and a connection order and method between each layer may also be variously modified.

Figure 11:
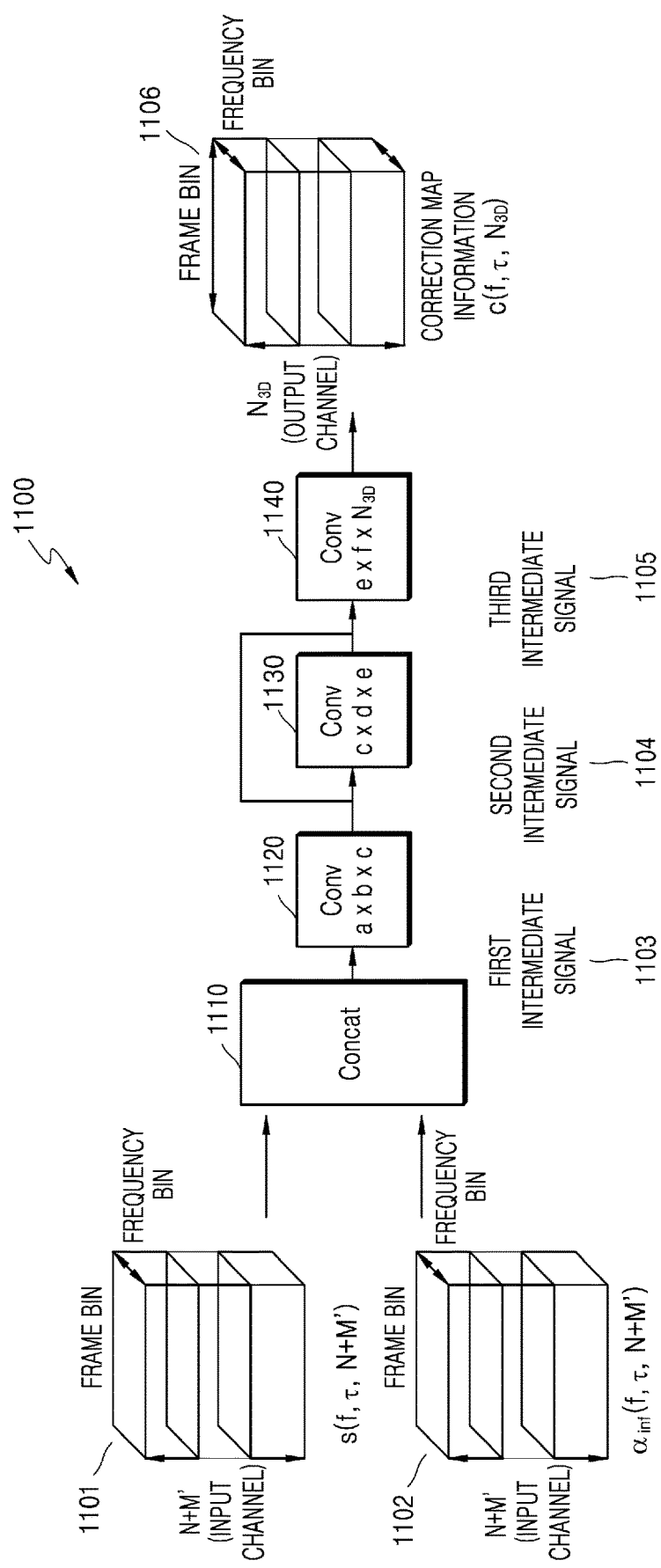
FIG. 11 is a diagram for describing a (4-$3^{rd}$) DNN according to an embodiment.

FIG. 11 is a diagram for describing a (4-3$^{rd}$) DNN 1100 according to an embodiment.

The (4-3$^{rd}$) DNN 1100 may include at least one convolution layer. The convolution layer obtains audio feature data by processing input data with a filter of a predetermined size. Parameters of the filter of the convolution layer may be optimized through a training process described below. The (4-3$^{rd}$) DNN 1100 may include a concatenation layer 1110, a first convolution layer 1120, a second convolution layer 1130, and a third convolution layer 1140.

Referring to FIG. 11, a first intermediate signal 1103 of a new dimension may be obtained by concatenating audio/image integrated feature information 1101 and correction information 1102 in the concatenation layer 1110. The audio/image integrated feature information 1001 includes samples divided according to the number of features, a time (frame bin), and a frequency bin. In other words, the audio/image integrated feature information 1001 may be three-dimensional data. Each of the samples of the audio/image integrated feature information 1001 may be an audio/image integrated feature value. The correction information 1102 includes samples divided according to the number of features, a time (frame bin), and a frequency bin. In other words, the correction information 1102 may be three-dimensional data. Each of the samples of the correction information 1102 may be a correction-related feature value.

FIG. 11 shows that sizes of the audio/image integrated feature information 1101 and the correction information 1102 are (f, τ, N+M'), where time lengths (the number of frame bins) of the audio/image integrated feature information 1101 and the correction information 1102 may be T, the number of features corresponding to the frame bin and the frequency bin may be N+M', and the number of frequency bins may be f. Depending on the embodiment, sizes of the audio/image integrated feature information 1101 and the correction information 1102, a size of a signal input to each layer, and a size of a signal output from each layer may be variously modified.

The first convolution layer 1120 processes the first intermediate signal 1103 with c filters of an a×b size. For example, as a result of processing of the first convolution layer 1120, a second intermediate signal 1104 of a (f, τ, c) size may be obtained. In other words, as a result of processing of the first convolution layer 1120, a second intermediate signal 1104 of a (f, τ, M") size may be obtained. Here, M" may be 2×(N+M'), but is not limited thereto.

The second convolution layer 1130 processes the second intermediate signal 1104 with e filters of a c×d size. For example, as a result of processing of the second convolution layer 1130, a third intermediate signal 1105 of (f, τ, e) size may be obtained. In other words, as a result of processing of the second convolution layer 1130, the third intermediate signal 1105 of a (f, t, M") size may be obtained. Here, M" may be 2×(N+M'), but is not limited thereto.

In this case, the second convolution layer 1130 may include a plurality of convolution layers, and an input of the first layer and an output of the second layer may be connected to each other and trained. The first layer and the second layer may be the same layer. However, the disclosure is not limited thereto, and the second layer may be a layer subsequent to the first layer. When the second layer is a layer subsequent to the first layer, an activation function of the first layer may be PReLU, and a parameter of the activation function may be trained together.

The third convolution layer 1140 processes an input signal with $N_{3D}$ filters of an e×f size. As a result of processing of the third convolution layer 1140, correction map information 1106 of a (f, τ, $N_{3D}$) size may be obtained.

The (4-3$^{rd}$) DNN 1100 according to an embodiment of the disclosure obtains the correction map information 1106 from the audio/image integrated feature information 1101 and the correction information 1102. In other words, although FIG. 11 shows that the (4-3$^{rd}$) DNN 1100 includes three convolution layers, this is only an example, and when the correction map information 1106 may be obtained from the audio/image integrated feature information 1101 and the correction information 1102, the number of convolution layers included in the (4-3$^{rd}$) DNN 1100 may be variously modified. Similarly, the number and sizes of filters used in each of the convolution layers may be variously modified, and a connection order and method between each layer may also be variously modified.

Figure 12:
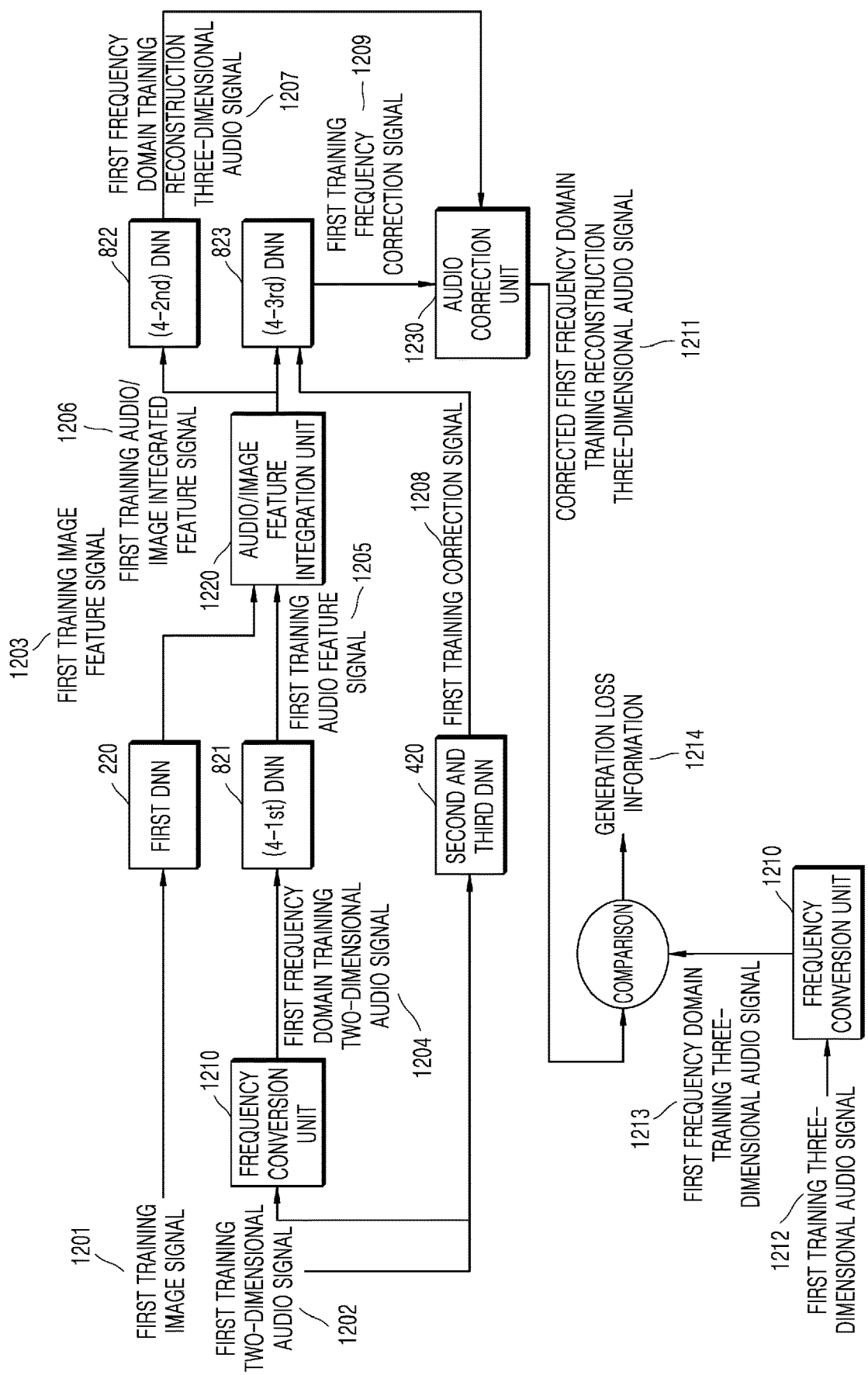
FIG. 12 is a diagram for describing a method of training a first DNN, a second DNN, a third DNN, and a fourth DNN.

FIG. 12 is a diagram for describing a training method for a first DNN, a second DNN, a third DNN, and a fourth DNN.

In FIG. 12, a first training two-dimensional audio signal 1202 corresponds to the two-dimensional audio signal 102, and a first training image signal 1201 corresponds to the video signal 101. Similar to the above, each of the training signals corresponds to signals/pieces of information described above with reference to FIGS. 2, 4, and 8.

The first training image signal 1201 is input to the first DNN 220. The first DNN 220 processes the first training image signal 1201 and obtains a first training image feature signal 1203 according to a preset parameter.

A first frequency domain training two-dimensional audio signal 1204 is obtained through a frequency conversion unit 1210 with respect to the first training two-dimensional audio signal 1202, and the first frequency domain training two-dimensional audio signal 1204 is input to the (4-1$^{st}$) DNN 821. The (4-1$^{st}$) DNN 821 processes the first frequency domain training two-dimensional audio signal 1204 and obtains a first training audio feature signal 1205 according to a preset parameter. A first training audio/image integrated feature signal 1206 may be obtained by processing the first training audio feature signal 1205 and the first training image feature signal 1203 through the audio/image feature integration unit 1220.

The first training two-dimensional audio signal 1202 are input to the second DNN and the third DNN 420. The (2-1$^{st}$) DNN 421, the (2-2$^{nd}$) DNN 422, and the third DNN 423 included in the second DNN and third DNN 420 process the first training two-dimensional audio signal 1202 and obtain a first training correction signal 1208 according to a preset parameter.

The first training audio/image integrated feature signal 1206 is input to the (4-2$^{nd}$) DNN 822. The (4-2$^{nd}$) DNN 822 processes the first training audio/image integrated feature signal 1206 and obtains a first frequency domain training reconstruction three-dimensional audio signal 1207 according to a preset parameter.

The first training correction signal 1208 and the first training audio/image integrated feature signal 1206 are input to the (4-3)$^{rd}$ DNN 823.

The (4-3$^{rd}$) DNN 823 processes the first training correction signal 1208 and the first training audio/image integrated feature signal 1206 and obtains a first training frequency correction signal 1209.

An audio correction unit 1230 may correct the first frequency domain training reconstruction three-dimensional audio signal 1207 based on the first training frequency correction signal 1209, and output a corrected first frequency domain training reconstruction three-dimensional audio signal 1211.

A first frequency domain training three-dimensional audio signal 1213 is obtained through a frequency conversion unit 1210 with respect to a first training three-dimensional audio signal 1212.

A generation loss information 1214 is obtained according to a result of comparison between the first frequency domain training three-dimensional audio signal 1213 and the corrected first frequency domain training reconstruction three-dimensional audio signal 1211. The generation loss information 1214 may include at least one of an L1-norm value, an L2-norm value, a structural similarity (SSIM) value, a peak signal-to-noise ratio-human vision system (PSNR-HVS) value, a multiscale SSIM (MS-SSIM) value, a variance inflation factor (VIF) value, and a video multimethod assessment fusion (VMAF) value between the first frequency domain training three-dimensional audio signal 1213 and the corrected first frequency domain training reconstruction three-dimensional audio signal 1211. For example, the loss information 1214 may be expressed as in [Mathematical Formula 2] shown below.

$$\text{Loss}=\|F(A_{REF\_B})-Cs\|^2 \qquad \text{[Mathematical Formula 2]}$$

In [Mathematical Formula 2], F( ) indicates a frequency conversion by the frequency conversion unit 1210, and Cs indicates the corrected first frequency domain training reconstruction three-dimensional audio signal 1211.

The generation loss information 1214 indicates a degree of similarity between the corrected first frequency domain training reconstruction three-dimensional audio signal 1211 obtained by processing the first training two-dimensional audio signal 1202 by the first DNN 220 and the second and third DNN 420 and the first frequency domain training three-dimensional audio signal 1213 obtained through the frequency conversion unit 1210.

The first DNN 220, the second DNN and third DNN 420, and the fourth DNN 820 may update a parameter so that the generation loss information 1214 is reduced or minimized. Training of the first DNN 220, the second DNN and third DNN 420, and the fourth DNN 820 may be expressed in the mathematical formula shown below.

$$\mathrm{argmin}(\mathrm{Loss}_{DG})$$

$$\omega^{Phase\ 1}$$

[Mathematical Formula 3]

In [Mathematical Formula 3], $\omega^{Phase\ 1}$ indicates a set of parameters of the first DNN 220, the second DNN and third DNN 420, and the fourth DNN 820. The first DNN 220, the second DNN and third DNN 420, and the fourth DNN 820 obtain a parameter set for minimizing the generation loss information 1214 through training.

Figure 13:
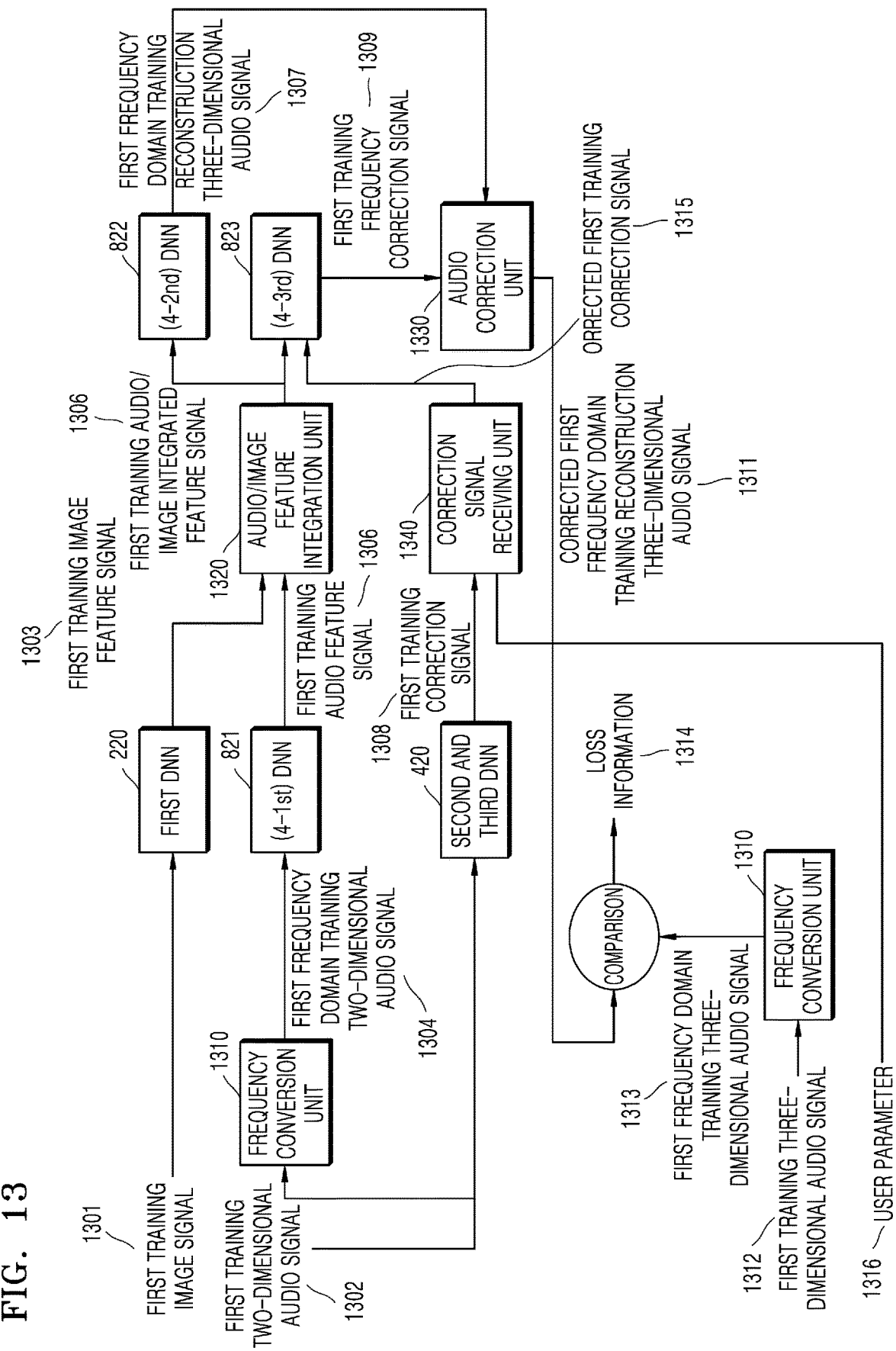
FIG. 13 is a diagram for describing a method of training a first DNN, a second DNN, a third DNN, and a fourth DNN by considering a user parameter signal.

FIG. 13 is a diagram for describing a training method for the first DNN, the second DNN, the third DNN, and the fourth DNN considering a user parameter signal.

Referring to FIG. 13, unlike FIG. 12, a correction signal correction unit 1340 is present between the second DNN and third DNN 420 and the (4-3$^{rd}$) DNN 823, the correction signal modification unit 1340 may correct a first training correction signal 1308 of the second DNN and third DNN 420 by using a user parameter 1316, and a corrected first training correction signal 1315 may be input to the (4-3$^{rd}$) DNN 823. For example, the correction signal correction unit 1340 may obtain the corrected first training correction signal 1315 by performing an arithmetic operation of multiplying a value of the first training correction signal 1308 by a user parameter $C_{user}$, but is not limited thereto. In other words, the user parameter is a parameter used to adjust a degree of correction of a three-dimensional audio signal by an audio correction unit 1330, and a user (a producer of three-dimensional audio) may directly input a user parameter so that the three-dimensional audio signal may be appropriately corrected and reconstructed according to a user's intention.

Also in FIG. 13, as described with reference to FIG. 12, it could be understood by those of skill in the art that parameters of the first DNN 220, the second DNN and third DNN 420, and the fourth DNN 820 may be trained based on a result of comparison between a corrected first frequency domain training reconstruction three-dimensional audio signal 1311 and a first frequency domain training three-dimensional audio signal 1313.

Figure 14:
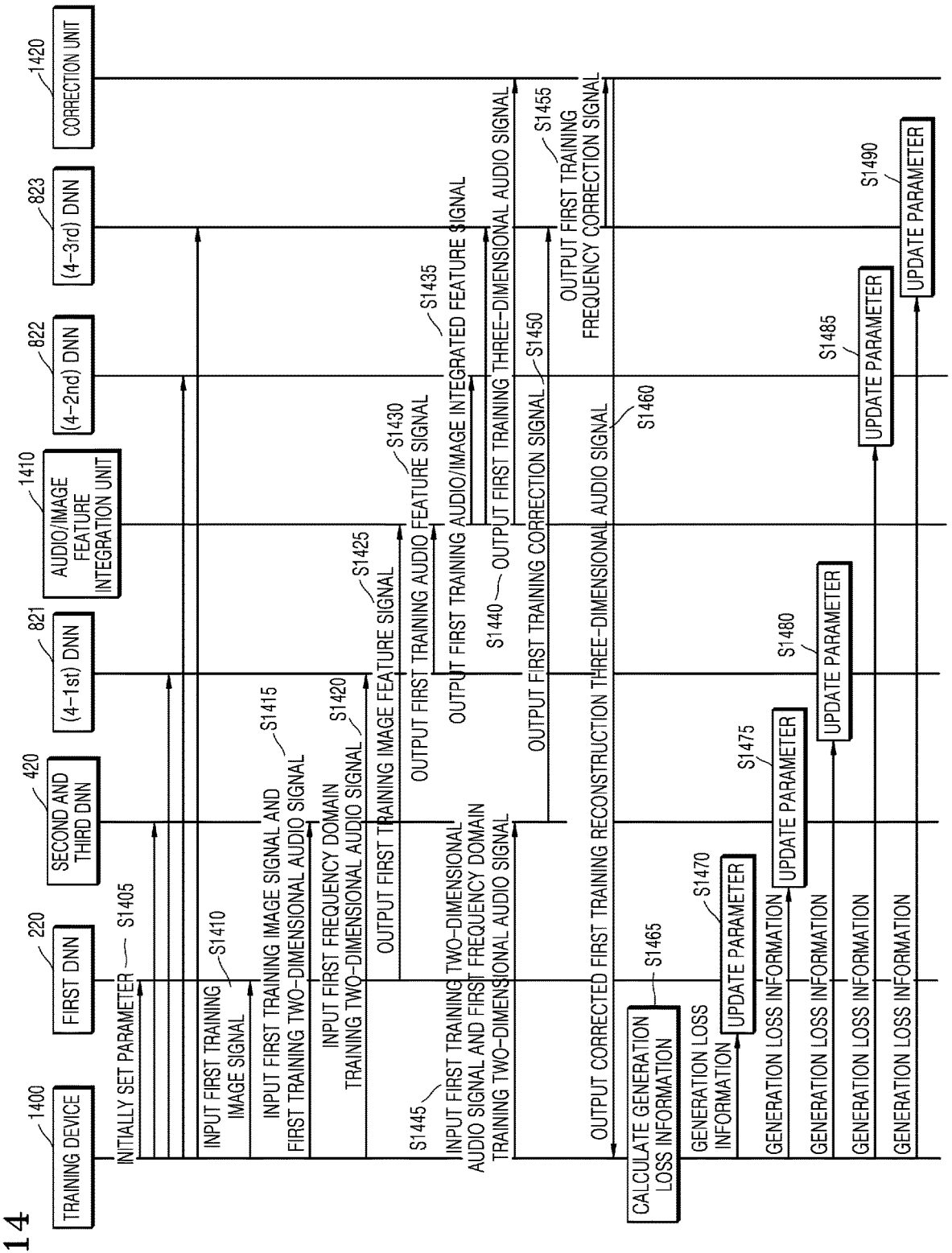
FIG. 14 is a flowchart for describing a process of training a first DNN, a second DNN, a third DNN, and a fourth DNN by a training device.

FIG. 14 is a flowchart for describing a training process the first DNN, the second DNN, the third DNN, and the fourth DNN by a training device 1400.

The training of the first DNN, the second DNN, the third DNN, and the fourth DNN described with reference to FIG. 12 may be performed by the training device 1400. The training device 1400 may include the first DNN 220, the second DNN and third DNN 420, and the fourth DNN 820. The training device 1400 may be, for example, the video processing apparatus 100 or an additional server.

The training device 1400 initially sets parameters of the first DNN 220, the second DNN and third DNN 420, the (4-1$^{st}$) DNN 821, the (4-2$^{nd}$) DNN 822, and the (4-3$^{rd}$) DNN 823 (S1405).

The training device 1400 inputs the first training image signal 1201 to the first DNN 220 (S1410).

The training device 1400 inputs the first training two-dimensional audio signal 1202 to the second DNN and third DNN 420 (S1415).

The training device 1400 inputs, to the (4-1$^{st}$) DNN 821, the first frequency domain training two-dimensional audio signal 1204 obtained through the frequency conversion unit 1210 (S1420).

The first DNN 220 may output the first training image feature signal 1203 to an audio/image feature integration unit 1410 (S1425).

The (4-1$^{st}$) DNN 821 may output the first training audio feature signal 1205 to the audio/image feature integration unit 1410 (S1430).

The audio/image feature integration unit 1410 may output the first training audio/image integration feature signal 1206 to the (4-2$^{nd}$) DNN 822 and the (4-3$^{rd}$) DNN 823 (S1435).

The (4-2$^{nd}$) DNN 822 may output the first training three-dimensional audio signal to a correction unit 1420 (S1440).

The training device 1400 may input the first training two-dimensional audio signal 1202 and the first frequency domain training two-dimensional audio signal 1204 to the second DNN and third DNN 420 (S1445).

The second DNN and third DNN 420 may output the first training correction signal 1208 to the (4-3$^{rd}$) DNN 823 (S1450).

The (4-3$^{rd}$) DNN 823 may output the first training frequency correction signal 1209 to the correction unit 1420 (S1455).

The correction unit 1420 may output the corrected first frequency domain training reconstruction three-dimensional audio signal 1211 to the training device 1400 (S1460).

The training device 1400 calculates the generation loss information 1214 by comparing the corrected first frequency domain training reconstruction three-dimensional audio signal 1211 with the first frequency domain training three-dimensional audio signal 1213 obtained through frequency conversion (S1465). In addition, the first DNN 220, the second DNN and third DNN 420, the (4-1$^{st}$) DNN 821, the (4-2$^{nd}$) DNN 822, and the (4-3$^{rd}$) DNN 823 update parameters according to the generation loss information 1214 (S1470-S1490).

The training device 1400 may repeat operations S1410 to S1490 described above, until the parameters of the first DNN 220, the second DNN and third DNN 420, the (4-1$^{st}$) DNN 821, the (4-2$^{nd}$) DNN 822, and the (4-3$^{rd}$) DNN 823 are optimized.

Figure 15:
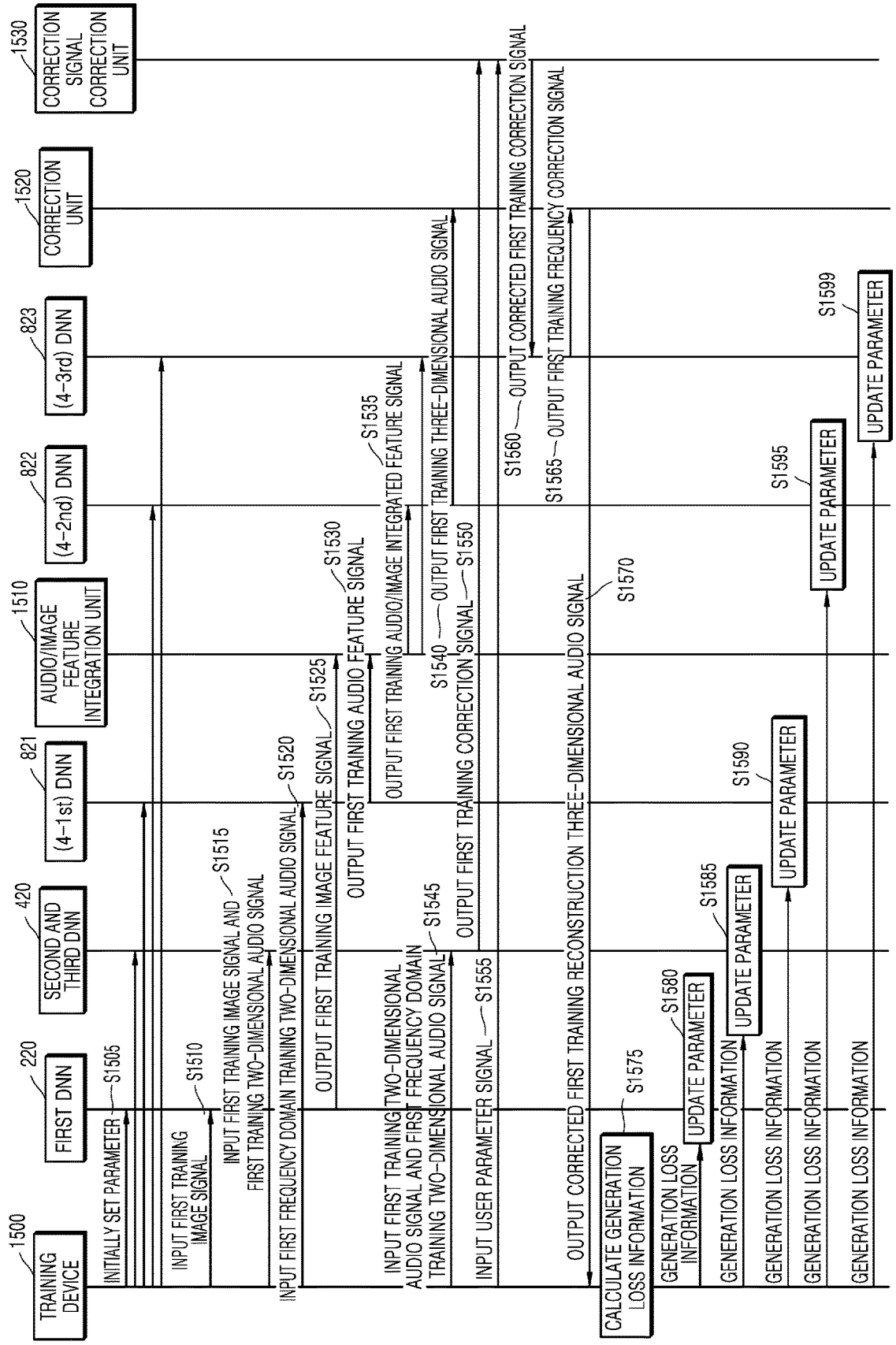
FIG. 15 is a flowchart for describing a process of training a first DNN, a second DNN, a third DNN, and a fourth DNN by a training device by considering a user parameter.

FIG. 15 is a flowchart for describing a training process for the first DNN, the second DNN, the third DNN, and the fourth DNN by a training device 1500 considering a user parameter.

The training of the first DNN, the second DNN, the third DNN, and the fourth DNN described with reference to FIG. 14 may be performed by the training device 1500 (S1505-S1599). The training device 1500 may include the first DNN 220, the second DNN and third DNN 420, and the fourth DNN 820. The training device 1500 may be, for example, the video processing apparatus 100 or an additional server. When trained in an additional server, parameter information related to the first DNN, the second DNN, the third DNN, and the fourth DNN may be transmitted to the video processing apparatus 100, and the video processing apparatus 100 may store the parameter information related to the first DNN, the second DNN, the third DNN, and the fourth DNN. In order to generate a three-dimensional audio signal from a two-dimensional audio signal, the video processing apparatus 100 may update the parameters of the first DNN, the second DNN, the third DNN, and the fourth DNN based on the parameter information related to the first DNN, the second DNN, the third DNN, and the fourth DNN, and generate and output a three-dimensional audio signal by using the first DNN, the second DNN, the third DNN, and the fourth DNN which are updated.

In FIG. 15, unlike described with reference to FIG. 14, a correction signal correction unit 1530 may be further included, and a process of the correction signal correction unit 1530 correcting the first training correction signal 1308 by using the user parameter 1316, and outputting the corrected first training correction signal 1315 to the $(4\text{-}3^{rd})$ DNN 823 may be added (S1560). Accordingly, in FIG. 15, unlike FIG. 14, training is performed by considering a user parameter, and thus, a three-dimensional audio signal corrected by further reflecting a user's intention may be generated and output.

Figure 16:
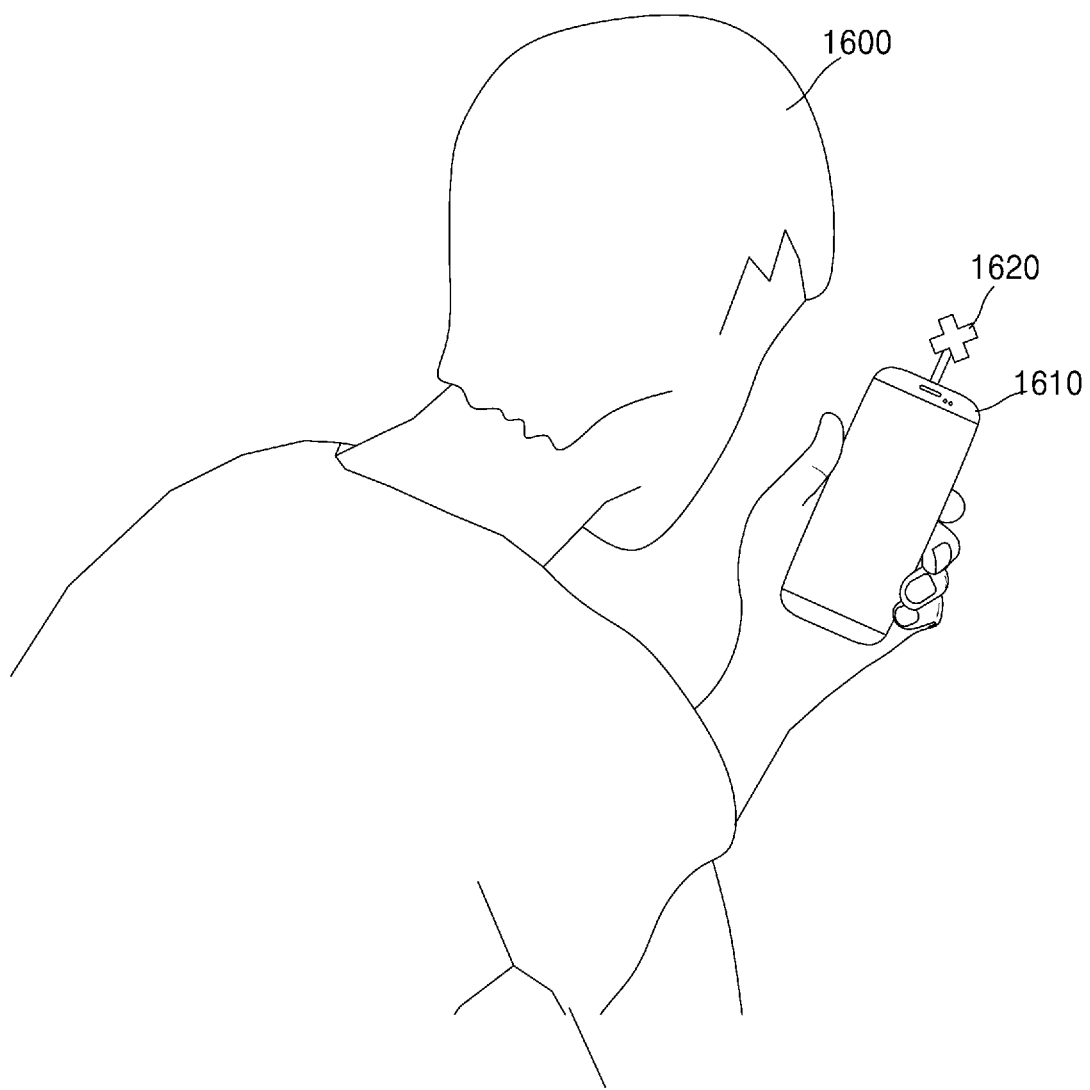
FIG. 16 is a diagram for describing a process of collecting data for training by a user using a user terminal.

FIG. 16 is a diagram for describing a process of a user collecting data for training by using a user terminal 1610.

In FIG. 16, the user 1600 may obtain a first training two-dimensional audio signal and a first training image signal by using a microphone and a camera of the user terminal 1610. Simultaneously, the user 1600 may obtain a first training three-dimensional audio signal by additionally mounting an ambisonic microphone 1620 on the user terminal 1610 or by using an ambisonic microphone 1620 included in the user terminal 1610.

In this case, the user terminal 1610 is an example of the video processing apparatus 100, and the user terminal 1610 may train the first DNN 220, the $(2\text{-}1^{st})$ DNN 421, the $(2\text{-}2^{nd})$ DNN 422, and the third DNN 423 included in the second DNN and third DNN 420, the $(4\text{-}1^{st})$ DNN 821, the $(4\text{-}2^{nd})$ DNN 822, and the $(4\text{-}3^{rd})$ DNN 823 based on training data, such as the first training two-dimensional audio signal, the first training image signal, and the first training three-dimensional audio signal which are obtained. Alternatively, the user terminal 1610 may transmit the training data to a device connected to the user terminal 1610, such as an additional server. The corresponding device is an example of the training devices 1400 and 1500 and may train the first DNN 220, the second DNN and third DNN 420, the $(4\text{-}1^{st})$ DNN 821, the $(4\text{-}2^{nd})$ DNN 822, and the $(4\text{-}3^{rd})$ DNN 823 based on the training data. Parameter information of the first DNN 220, the second DNN and third DNN 420, the $(4\text{-}1^{st})$ DNN 821, the $(4\text{-}2^{nd})$ DNN 822, and the $(4\text{-}3^{rd})$ DNN 823 which are trained may be obtained, and the parameter information of the first DNN 220, the second DNN and third DNN 420, the $(4\text{-}1^{st})$ DNN 821, the $(4\text{-}2^{nd})$ DNN 822, and the $(4\text{-}3^{rd})$ DNN 823 may be transmitted to the user terminal 1610. The user terminal 1610 may obtain the parameter information of the first DNN 220, the second DNN and third DNN 420, the $(4\text{-}1^{st})$ DNN 821, the $(4\text{-}2^{nd})$ DNN 822, and the $(4\text{-}3^{rd})$ DNN 823, and store the parameter information of the first DNN 220, the second DNN and third DNN 420, the $(4\text{-}1^{st})$ DNN 821, the $(4\text{-}2^{nd})$ DNN 822, and the $(4\text{-}3^{rd})$ DNN 823.

Thereafter, the user terminal 1610 may obtain a two-dimensional audio signal and image signal. The user terminal 1610 may obtain the pre-stored parameter information of the first DNN 220, the second DNN and third DNN 420, the $(4\text{-}1^{st})$ DNN 821, the $(4\text{-}2^{nd})$ DNN 822, and the $(4\text{-}3^{rd})$ DNN 823, update parameters of the first DNN 220, the second DNN and third DNN 420, the $(4\text{-}1^{st})$ DNN 821, the $(4\text{-}2^{nd})$ DNN 822, and the $(4\text{-}3^{rd})$ DNN 823, obtain updated parameter information of the first DNN 220, the second DNN and third DNN 420, the $(4\text{-}1^{st})$ DNN 821, the $(4\text{-}2^{nd})$ DNN 822, and the $(4\text{-}3^{rd})$ DNN 823, and generate and output a three-dimensional audio signal from the two-dimensional audio signal and image signal by using the first DNN 220, the second DNN and third DNN 420, the $(4\text{-}1^{st})$ DNN 821, the $(4\text{-}2^{nd})$ DNN 822, and the $(4\text{-}3^{rd})$ DNN 823.

However, the disclosure is not limited thereto, and the user terminal 1610 is only a simple training information collecting device and may transmit training data to a device, such as an additional server connected to the user terminal 1610 via a network. In this case, the corresponding device may be an example of the training devices 1400 and 1500 and the video processing apparatus 100.

The corresponding device may obtain the parameter information of the first DNN 220, the second DNN and third DNN 420, the $(4\text{-}1^{st})$ DNN 821, the $(4\text{-}2^{nd})$ DNN 822, and the $(4\text{-}3^{rd})$ DNN 823 based on the training data, and train the first DNN 220, the second DNN and third DNN 420, the $(4\text{-}1^{st})$ DNN 821, the $(4\text{-}2^{nd})$ DNN 822, and the $(4\text{-}3^{rd})$ DNN 823. The parameter information of the first DNN 220, the second DNN and third DNN 420, the $(4\text{-}1^{st})$ DNN 821, the $(4\text{-}2^{nd})$ DNN 822, and the DNN 823 which are trained may be obtained, the parameter information of the first DNN 220, the second DNN and third DNN 420, the $(4\text{-}1^{st})$ DNN 821, the $(4\text{-}2^{nd})$ DNN 822, and the $(4\text{-}3^{rd})$ DNN 823 may be obtained, the parameter information of the first DNN 220, the second DNN and third DNN 420, the $(4\text{-}1^{st})$ DNN 821, the $(4\text{-}2^{nd})$ DNN 822, and the $(4\text{-}3^{rd})$ DNN 823 may be transmitted to the user terminal 1610 or the parameter information of the first DNN 220, the second DNN and third DNN 420, the $(4\text{-}1^{st})$ DNN 821, the $(4\text{-}2^{nd})$ DNN 822, and the $(4\text{-}3^{rd})$ DNN 823 may be obtained, and the parameter information of the first DNN 220, the second DNN and third DNN 420, the $(4\text{-}1^{st})$ DNN 821, the $(4\text{-}2^{nd})$ DNN 822, and the $(4\text{-}3^{rd})$ DNN 823 may be stored in the user terminal 1610, or may be stored in the corresponding device or an additional database connected thereto, to correspond to an identifier of the user terminal 1610.

Thereafter, the user terminal 1610 may obtain the two-dimensional audio signal and image signal. The user terminal 1610 may obtain the pre-stored parameter information of the first DNN 220, the second DNN and third DNN 420, the $(4\text{-}1^{st})$ DNN 821, the $(4\text{-}2^{nd})$ DNN 822, and the $(4\text{-}3^{rd})$ DNN 823, and may transmit the two-dimensional audio signal and image signal to the corresponding device together with the parameter information of the first DNN 220, the second DNN and third DNN 420, the $(4\text{-}1^{st})$ DNN 821, the $(4\text{-}2^{nd})$ DNN 822, and the $(4\text{-}3^{rd})$ DNN 823. The corresponding device may obtain the parameter information of the first DNN 220, the second DNN and third DNN 420, the $(4\text{-}1^{st})$ DNN 821, the $(4\text{-}2^{nd})$ DNN 822, and the $(4\text{-}3^{rd})$ DNN 823 received from the user terminal 1610, update parameters of the first DNN 220, the second DNN and third DNN 420, the $(4\text{-}1^{st})$ DNN 821, the $(4\text{-}2^{nd})$ DNN 822, and the $(4\text{-}3^{rd})$ DNN 823, obtain the parameter information of the first DNN 220, the second DNN and third DNN 420, the $(4\text{-}1^{st})$ DNN 821, the $(4\text{-}2^{nd})$ DNN 822, and the $(4\text{-}3^{rd})$ DNN 823, and obtain a three-dimensional audio signal from the two-dimensional audio signal and image signal received from the user terminal 1610 by using the first DNN 220, the second DNN and third DNN 420, the $(4\text{-}1^{st})$ DNN 821, the $(4\text{-}2^{nd})$ DNN 822, and the $(4\text{-}3^{rd})$ DNN 823. Alternatively, the user terminal 1610 may transmit a two-dimensional audio signal and image signal to the corresponding device. The corresponding device may obtain parameter information of the first DNN 220, the second DNN and third DNN 420, the (4-1$^{st}$) DNN 821, the (4-2$^{nd}$) DNN 822, and the (4-3$^{rd}$) DNN 823, which is pre-stored to correspond to an identifier of the user terminal 1610, and obtain a three-dimensional audio signal from the two-dimensional audio signal and image signal received from the user terminal 1610 by using the first DNN 220, the second DNN and third DNN 420, the (4-1$^{st}$) DNN 821, the (4-2$^{nd}$) DNN 822, and the (4-3$^{rd}$) DNN 823.

The training devices 1400 and 1500 connected to the user terminal 1610 via a network may be present separately from the video processing apparatus 100.

In this case, the user terminal 1610 may transmit training data to the training devices 1400 and 1500 and obtain parameter information of the first DNN 220, the second DNN and third DNN 420, the (4-1$^{st}$) DNN 821, the (4-2$^{nd}$) DNN 822, and the DNN (4-3$^{rd}$) 823, obtain the parameter information of the first DNN 220, the second DNN and third DNN 420, the (4-1$^{st}$) DNN 821, the (4-2$^{nd}$) DNN 822, and the (4-3$^{rd}$) DNN 823, obtain parameter information of the first DNN 220, the second DNN and third DNN 420, the (4-1$^{st}$) DNN 821, the (4-2$^{nd}$) DNN 822, and the (4-3$^{rd}$) DNN 823, which is previously obtained together with the two-dimensional audio signal and image signal, and transmit the parameter information of the first DNN 220, the second DNN and third DNN 420, the (4-1$^{st}$) DNN 821, the (4-2$^{nd}$) DNN 822, and the (4-3$^{rd}$) DNN 823 to the video processing apparatus 1000, thereby receiving a three-dimensional audio signal from the video processing apparatus 100.

FIG. 17 is a flowchart for describing a video processing method according to an embodiment.

In operation S1710, the video processing apparatus 100 may generate, based on a first DNN, a plurality of feature information for each time and frequency by analyzing a video signal including a plurality of images.

In operation S1720, the video processing apparatus 100 may extract, based on a second DNN a first altitude component and a first planar component corresponding to a movement of an object in a video from the video signal.

In operation S1730, the video processing apparatus 100 may extract, based on a third DNN, a second planar component corresponding to a movement of a sound source in audio from a first audio signal not having an altitude component.

In operation S1740, the video processing apparatus 100 may generate a second altitude component based on the first altitude component, the first planar component and the second planar component. In this case, the generated second altitude component may be a second altitude component itself, but is not limited thereto, and may be information related to the second altitude component.

In operation S1750, the video processing apparatus 100 may output a second audio signal including the second altitude component based on the feature information. The disclosure is not limited thereto, and the video processing apparatus 100 may output the second audio signal including the second altitude component based on the feature information and the information related to the second altitude component.

In operation S1760, the video processing apparatus 100 may synchronize the second audio signal with the video signal and output the same.

The embodiments of the disclosure described above may be written as a program executable by a computer, and the prepared program may be stored in a non-transitory computer-readable medium. The term "non-transitory" means that the storage medium is a tangible device, and does not include a signal (e.g., an electromagnetic wave), but this term does not differentiate between where data is semi-permanently stored in the storage medium and where the data is temporarily stored in the storage medium.

The medium may continuously store programs executable by a computer, or may temporarily store the programs for execution or download. In addition, the medium may be various recording means or storage means in the form of single hardware or in a combination of several hardware, and is not limited to a medium directly connected to a certain computer system and may be present on a network in a distributed manner. Examples of media may include magnetic media, such as hard disks, floppy disks, and magnetic tapes, optical recording media, such as CD-ROMs and DVDs, magneto-optical media, such as floptical disks, and media configured to store program instructions by including ROM, RAM, flash memory, or the like. In addition, examples of other media may include recording media or storage media managed by an app store that distributes applications, a site that supplies or distributes various other software, and a server.

Although embodiments of the disclosure have been described, the technical idea of the disclosure is not limited to the embodiments described above, and may be variously modified and changed by a person having an ordinary skill in the art within the scope of the technical idea of the disclosure.

What is claimed is:

1. A video processing apparatus comprising:
   a memory storing at least one instruction; and
   at least one processor configured to execute the at least one instruction to:
   generate a plurality of feature information for time and frequency by analyzing a video signal comprising a plurality of images, based on a first deep neural network (DNN);
   extract a first altitude component corresponding to a movement of an object in a vertical direction in a video and a first planar component corresponding to the movement of the object in a horizontal direction in the video from the video signal, based on a second DNN;
   extract a second planar component corresponding to a movement of a sound source in the horizontal direction in audio from a first audio signal, based on a third DNN;
   generate a second altitude component corresponding to the movement of the sound source in the vertical direction in the audio based on the first altitude component, the first planar component, and the second planar component;
   output a second audio signal comprising the second altitude component, based on the plurality of feature information; and
   synchronize the second audio signal with the video signal and output the synchronized second audio signal and video signal.

2. The video processing apparatus of claim 1, wherein the at least one processor is further configured to execute the at least one instruction to:
   synchronize the video signal with the first audio signal;
   generate M pieces of one-dimensional image feature map information corresponding to the movement of the object in the video from the video signal by using the first DNN, M being an integer greater than or equal to 1; and
   generate the plurality of feature information for time and frequency by performing tiling related to frequency on the M pieces of one-dimensional image feature map information, the plurality of feature information including the M pieces of one-dimensional image feature map information for time and frequency.

3. The video processing apparatus of claim 1, wherein the at least one processor is further configured to execute the at least one instruction to:
synchronize the video signal with the first audio signal:
extract N+M pieces of feature map information corresponding to the movement of the object in the horizontal direction in the video with respect to time from the video signal by using a (2-1st) DNN, N and M being integers greater than or equal to 1;
extract N+M pieces of feature map information corresponding to the movement of the object in the vertical direction in the video with respect to time from the video signal by using a (2-2nd) DNN, wherein the (2-1st) DNN and the (2-2nd) DNN are included in the second DNN and are different from each other;
extract N+M pieces of feature map information corresponding to the movement of the sound source in the horizontal direction in the audio from the first audio signal by using the third DNN;
generate N+M pieces of correction map information with respect to time corresponding to the second altitude component based on the N+M pieces of feature map information corresponding to the movement of the object in the horizontal direction in the video, the N+M pieces of feature map information corresponding to the movement of the object in the vertical direction in the video, and the N+M pieces of feature map information corresponding to the movement of the sound source in the horizontal direction in the audio; and
generate N+M pieces of correction map information with respect to time and frequency corresponding to the second altitude component by performing tiling related to frequency on the N+M pieces of correction map information with respect to time.

4. The video processing apparatus of claim 1, wherein the at least one processor is further configured to execute the at least one instruction to:
generate time and frequency information for a 2-channel by performing frequency conversion operation on the first audio signal;
generate N pieces of audio feature map information with respect to time and frequency from the time and frequency information for the 2-channel by using a (4-1st) DNN, N being an integer greater than or equal to 1;
generate N+M pieces of audio and image integrated feature map information based on M pieces of image feature map information with respect to time and frequency included in the plurality of feature information for time and frequency and the N pieces of audio feature map information with respect to time and frequency;
generate a frequency domain second audio signal for n-channel (where, n is an integer greater than 2) from the N+M pieces of audio and image integrated feature map information by using a (4-2nd) DNN;
generate an audio correction map information for the n-channel from N+M pieces of correction map information with respect to time and frequency corresponding to the N+M pieces of audio/image integrated feature map information and the second altitude component by using a (4-3rd) DNN;
generate a corrected frequency domain second audio signal for the n-channel by performing correction on the frequency domain second audio signal for the n-channel based on the audio correction map information for the n-channel; and
output the second audio signal for the n-channel by inversely frequency converting the corrected frequency domain second audio signal for the n-channel, and
wherein the (4-1st) DNN, the (4-2nd) DNN and the (4-3rd) DNN are included in a fourth DNN for outputting the second audio signal and are different from each other.

5. The video processing apparatus of claim 1, wherein the at least one processor is further configured to execute the at least one instruction to output the second audio signal based on a fourth DNN for outputting the second audio signal,
wherein the first DNN is a DNN for generating the plurality of feature information for time and frequency, the second DNN is a DNN for extracting the first altitude component and the first planar component, the third DNN is a DNN for extracting the second planar component, and
wherein the at least one processor is further configured to execute the at least one instruction to train the first DNN, the second DNN, the third DNN and the fourth DNN according to a result of comparison of a first frequency domain training reconstruction three-dimensional audio signal reconstructed based on a first training two-dimensional audio signal and a first training image signal with a first frequency domain training three-dimensional audio signal obtained by frequency converting a first training three-dimensional audio signal.

6. The video processing apparatus of claim 5, wherein the at least one processor is further configured to execute the at least one instruction to:
determine generation loss information by comparing the first frequency domain training reconstruction three-dimensional audio signal with the first frequency domain training three-dimensional audio signal, and
update parameters of the first DNN, the second DNN, the third DNN and the fourth DNN based on the generation loss information.

7. The video processing apparatus of claim 1, wherein the at least one processor is further configured to execute the at least one instruction to output the second audio signal based on a fourth DNN for outputting the second audio signal,
wherein the first DNN is a DNN for generating the plurality of feature information for time and frequency, the second DNN is a DNN for extracting the first altitude component and the first planar component, and the third DNN is a DNN for extracting the second planar component, and
wherein the at least one processor is further configured to execute the at least one instruction to train the first DNN, the second DNN, the third DNN, and the fourth DNN according to a result of comparison of a frequency domain training reconstruction three-dimensional audio signal reconstructed based on a first training two-dimensional audio signal, a first training image signal and a user input parameter information with a first frequency domain training three-dimensional audio signal obtained by frequency converting a first training three-dimensional audio signal.

8. The video processing apparatus of claim 7, wherein the at least one processor is further configured to execute the at least one instruction to:

determine generation loss information by comparing the frequency domain training reconstruction three-dimensional audio signal with the first frequency domain training three-dimensional audio signal, and update parameters of the first DNN, the second DNN, the third DNN, and the fourth DNN based on the generation loss information.

9. The video processing apparatus of claim 5, wherein the first training two-dimensional audio signal and the first training image signal are obtained from a portable terminal, and wherein the first training three-dimensional audio signal is obtained from an ambisonic microphone of the portable terminal.

10. The video processing apparatus of claim 5, wherein parameter information of the first DNN, the second DNN, the third DNN, and the fourth DNN obtained as a result of training of the first DNN, the second DNN, the third DNN, and the fourth DNN is stored in the video processing apparatus or is received from a terminal connected to the video processing apparatus.

11. A video processing method of a video processing apparatus, the video processing method comprising:

generating a plurality of feature information for time and frequency by analyzing a video signal comprising a plurality of images based on a first deep neural network (DNN);

extracting a first altitude component corresponding to a movement of an object in a vertical direction in a video and a first planar component corresponding to the movement of the object in a horizontal direction in the video, from the video signal based on a second DNN;

extracting a second planar component corresponding a movement of a sound source in the horizontal direction in an audio from a first audio signal, based on a third DNN;

generating a second altitude component corresponding to the movement of the sound source in the vertical direction in the audio based on the first altitude component, the first planar component, and the second planar component;

outputting a second audio signal comprising the second altitude component, based on the plurality of feature information; and synchronizing the second audio signal with the video signal and outputting the synchronized second audio signal and video signal.

12. The video processing method of claim 11, wherein the generating the plurality of feature information for time and frequency comprises:

synchronizing the video signal with the first audio signal;

generating M pieces of one-dimensional image feature map information corresponding to the movement of the object in the video from the video signal by using the first DNN, M being an integer greater than or equal to 1; and generating the plurality of feature information for time and frequency by performing tiling related to frequency on the M pieces of one-dimensional image feature map information, the plurality of feature information including M pieces of image feature map information for time and frequency.

13. The video processing method of claim 11, wherein the extracting the first altitude component and the first planar component based on the second DNN and the extracting of the second planar component based on the third DNN comprise:

synchronizing the video signal with the first audio signal;

extracting N+M pieces of feature map information corresponding to the movement of the object in the horizontal direction in the video with respect to time from the video signal by using a (2-1st) DNN, N and M being integers greater than or equal to 1;

extracting N+M pieces of feature map information corresponding to the movement of the object in the vertical direction in the video with respect to time from the video signal by using a (2-2nd) DNN, wherein the (2-1st) DNN and the (2-2nd) DNN are included in the second DNN and are different from each other;

extracting N+M pieces of feature map information corresponding to the movement of the sound source in the horizontal direction in the audio from the first audio signal by using the third DNN, and wherein the generating of the second altitude component based on the first altitude component, the first planar component, and the second planar component comprises:

generating N+M pieces of correction map information with respect to time corresponding to the second altitude component based on the N+M pieces of feature map information corresponding to the movement of the object in the horizontal direction in the video, the N+M pieces of feature map information corresponding to the movement of the object in the vertical direction, and the N+M pieces of feature map information corresponding to the movement of the sound source in the horizontal direction in the audio; and generating N+M pieces of correction map information with respect to time and frequency corresponding to the second altitude component by performing tiling related to a frequency on the N+M pieces of correction map information with respect to time.

14. The video processing method of claim 11, wherein the outputting the second audio signal comprising the second altitude component based on the plurality of feature information comprises:

obtaining time and frequency information for a 2-channel by performing frequency conversion operation on the first audio signal;

generating, from the time and frequency information for the 2-channel, N pieces of audio feature map information with respect to time and frequency by using a (4-1st) DNN, N being an integer greater than or equal to 1;

generating N+M pieces of audio and image integrated feature map information based on M pieces of image feature map information with respect to time and frequency included in the plurality of feature information for time and frequency and the N pieces of audio feature map information with respect to time and frequency;

generating a frequency domain second audio signal for n-channel (wherein, n is an integer greater than 2) from the N+M pieces of audio and image integrated feature map information by using a (4-2nd) DNN;

generating a audio correction map information with respect to the n-channel corresponding to the second altitude component from the N+M pieces of audio/image integrated feature map information by using a (4-3rd) DNN;

generating a corrected frequency domain second audio signal for the n-channel by performing correction on the frequency domain second audio signal for the n-channel based on the audio correction map information for the n-channel; and outputting the second audio signal for the n-channel by inversely frequency converting the corrected frequency domain second audio signal, and wherein the (4-1st) DNN, the (4-2nd) DNN and the (4-3rd) DNN are included in a fourth DNN for outputting the second audio signal and are different from each other.

15. The video processing method of claim 11, wherein the outputting of the second audio signal comprises outputting the second audio signal based on a fourth DNN for outputting the second audio signal,
wherein the first DNN is a DNN for generating the plurality of feature information for each time and frequency, the second DNN is a DNN for extracting the first altitude component and the first planar component, and the third DNN is a DNN for extracting the second planar component, and
wherein the video processing method further comprises training the first DNN, the second DNN, the third DNN, and the fourth DNN according to a result of comparison of a first frequency domain training reconstruction three-dimensional audio signal reconstructed based on a first training two-dimensional audio signal and a first training image signal with a first frequency domain training three-dimensional audio signal obtained by frequency converting a first training three-dimensional audio signal.

16. The video processing method of claim 15, further comprising:
determining generation loss information by comparing the first frequency domain training reconstruction three-dimensional audio signal with the first frequency domain training three-dimensional audio signal, and
updating parameters of the first DNN, the second DNN, the third DNN, and the fourth DNN based on the generation loss information.

17. The video processing apparatus of claim 15, wherein parameter information of the first DNN, the second DNN, the third DNN, and the fourth DNN obtained as a result of training of the first DNN, the second DNN, the third DNN, and the fourth DNN is stored in the video processing apparatus or is received from a terminal connected to the video processing apparatus.

18. The video processing method of claim 11, wherein the outputting the second audio signal comprises outputting the second audio signal based on a fourth DNN for outputting the second audio signal,
wherein the first DNN is a DNN for generating the plurality of feature information for each time and frequency, the second DNN is a DNN for extracting the first altitude component and the first planar component, and the third DNN is a DNN for extracting the second planar component, and
wherein the method further comprises training the first DNN, the second DNN, the third DNN, and the fourth DNN according to a result of comparison of a first frequency domain training reconstruction three-dimensional audio signal reconstructed based on a first training two-dimensional audio signal, a first training image signal and user input information with a first frequency domain training three-dimensional audio signal obtained by frequency converting a first training three-dimensional audio signal.

19. The video processing method of claim 18, further comprising:
determining generation loss information by comparing the first frequency domain training reconstruction three-dimensional audio signal with the first frequency domain training three-dimensional audio signal, and
updating parameters of the first to fourth DNNs based on the generation loss information.

20. A non-transitory computer-readable recording medium having recorded thereon a program that is executable by a processor to perform the method of claim 11.

* * * * *